United States Patent
Andros et al.

(10) Patent No.: US 10,631,461 B1
(45) Date of Patent: Apr. 28, 2020

(54) DEVICE AND SYSTEM FOR EXTRACTING AND DENSIFYING AGRICULTURAL PLASTICS

(71) Applicant: Andros Engineering, Paso Robles, CA (US)

(72) Inventors: Matthew James Andros, Santa Margarita, CA (US); Harrison Honerkamp, Paso Robles, CA (US); Thomas Richard Klippenstein, Paso Robles, CA (US); Simon Torres, Paso Robles, CA (US)

(73) Assignee: ANDROS ENGINEERING, Paso Robles, CA (US)

( * ) Notice: Subject to any disclaimer, the term of this patent is extended or adjusted under 35 U.S.C. 154(b) by 270 days.

(21) Appl. No.: 15/069,546

(22) Filed: Mar. 14, 2016

(51) Int. Cl.
*A01D 43/00* (2006.01)
*A01D 101/00* (2006.01)

(52) U.S. Cl.
CPC .......... *A01D 43/00* (2013.01); *A01D 2101/00* (2013.01)

(58) Field of Classification Search
CPC ............ A01G 13/0287; A01G 13/0218; A01B 77/00; A01B 43/00
See application file for complete search history.

(56) References Cited

U.S. PATENT DOCUMENTS

| | | | | |
|---|---|---|---|---|
| 4,796,711 A | * | 1/1989 | Chrysler | A01G 13/0287 171/1 |
| 5,236,051 A | * | 8/1993 | Sawyer | A01G 13/0287 171/45 |
| 10,285,330 B1 | * | 5/2019 | Kimball | A01D 43/0636 |
| 2009/0277149 A1 | * | 11/2009 | Adkins | A01D 34/64 56/255 |

* cited by examiner

*Primary Examiner* — Jessica H Lutz
(74) *Attorney, Agent, or Firm* — R. Scott Kimsey, Esq.; Klein DeNatale Goldner

(57) ABSTRACT

A system and method for extracting and densifying agricultural plastic from a crop bed includes a mower configured to cut plant material on a crop bed. The mower includes a frame, and a brush and blade attached to the frame. The brush is preferably configured to sweep plant material along the edge of the crop bed into the path of the blade. The system further includes an extractor system having an extractor head assembly for lifting the agricultural plastic from the crop bed after mowing is completed. Embodiments of the extractor system may include a frame, a roller rotatably attached to the frame, and an extractor head assembly positioned rearward of the roller. Agricultural plastic engaged by the extractor head assembly is pulled over the roller. The system may include a winding device configured to densify the agricultural plastic after it has been extracted and lifted off the bed.

12 Claims, 40 Drawing Sheets

DEVICE AND SYSTEM FOR EXTRACTING AND DENSIFYING AGRICULTURAL PLASTICS

RELATED APPLICATIONS

Not Applicable.

BACKGROUND AND FIELD

1. Field

The present device and system relate generally to the art of extracting and densifying agricultural plastics, and more specifically to the art of extracting drip tape and/or plastic mulch from the soil and densifying the same in a form ready for transport and recycling.

2. Background

Drip tape and plastic mulch are widely used in the agricultural industry. Drip tape is typically constructed from thin-walled polyethylene and used to provide a low-volume, precise flow of water, fertilizers and other agricultural chemicals to plants and crops. Plastic mulch is also often constructed from polyethylene film and is used, among other reasons, to preserve water and suppress weed growth in crop production.

One disadvantage of utilizing drip lines and plastic mulch is that these materials are difficult to remove from the field after use. The process of removing drip tape and plastic mulch from the soil, and disposing of it, is typically performed by hand. Hand removal is burdensome to workers, and represents a disproportionately large expense for the owner of the crop. Although the materials used to construct drip tape and plastic mulch are readily recyclable, both of these are typically sent to the nearest landfill for disposal. Removal of these materials by hand yields loosely-bound plastic film(s) that include(s) a disproportionate amount of materials other than plastic, such as soil, water and crop residue and are not suitable for recycling. In California alone, 100 to 150 million pounds of agricultural plastic are discarded each year.

SUMMARY

The present disclosure relates to a system for extracting and densifying agricultural plastics. Embodiments of the system include a first-pass mower that travels over a crop bed and makes an initial cut of the plant material thereon. The first-pass mower is followed by a second-pass mower that further cuts the plant material on the crop bed. The mowers cut the plant material without disturbing agricultural plastics, like drip tape and plastic mulch, disposed in or on the crop bed. It is preferred that the second-pass mower cut the plant material as close to the crop bed as possible without disturbing the agricultural plastics.

Other embodiments of the disclosed system may include a single-pass mower that cuts the plant material to a sufficient height without the need for additional mowers. The single-pass mower disclosed herein incorporates two subframes that are pivotally connected so that the mower conforms more closely to the horizontal profile of the crop bed. Each subframe of the single-pass mower includes its own blade or blades.

After the plant material on the crop bed has been cut to a sufficient level, an extractor system is used to extract the agricultural plastics from the crop bed. The extractor system travels along the length of the crop bed and includes one or more extractor head assemblies that pull the agricultural plastics from the crop bed and deposit them back onto the surface thereof in a form and manner that allows the plastics to be easily densified by a winding device. In embodiments of the extractor system having multiple extractor head assemblies, a first extractor head assembly may be used to extract drip tape from the crop bed, and a second extractor head assembly may be used to extract plastic mulch from the crop bed. Thus, the two agricultural plastics are kept separate. The drip tape may be deposited back onto the surface of the crop bed, while the plastic mulch may be deposited into a furrow alongside the crop bed.

Once the extraction process has been completed, a winding device travels perpendicular to the crop bed and densifies the agricultural plastics, winding them into readily transportable, salable bundles. The winding device is configured so that the densified rolls of agricultural plastics are easily removed therefrom.

One embodiment described herein includes a system and method for extracting agricultural plastic from a crop bed and densifying the agricultural plastic in a readily transportable form. The system may include a mower configured to cut the plant material on a crop bed. Embodiments of the mower may include a frame, a brush attached to the frame, and a blade attached to the frame. The brush is preferably configured to sweep plant material along the edge of the crop bed into the path of the blade. The system may further include an extractor system having an extractor head assembly, the extractor system configured to extract and lift the agricultural plastic from the crop bed after mowing is completed. Embodiments of the extractor system may include a frame, a roller rotatably attached to the frame, and an extractor head assembly positioned rearward of the roller. Agricultural plastic engaged by the extractor head assembly is pulled over the roller, allowing dirt and other debris to fall from the roller. The system may also include a winding device configured to densify the agricultural plastic after it has been extracted and lifted off the bed. The agricultural plastic is wound into a readily transportable configuration.

In some embodiments of the system, the frame of the mower may include a first subframe and a second subframe, the two subframes being pivotably connected. The blade of the mower is a first blade attached to the first subframe, and the mower also includes a second frame attached to the second subframe. The brush of the mower is a first brush attached to the first subframe, and the mower also includes a second brush attached to the second subframe. A first roller is attached to the first subframe, and a second roller is attached to the second subframe. The first and second rollers engage the surface of the crop bed during operation of the mower. The pivotable attachment between the first and second subframes allows each subframe to independently conform to a portion of the profile of the crop bed.

In some embodiments of the system, the extractor head assembly may include a first pinch wheel rotatably attached to a first support and a second pinch wheel rotatably attached to a second support. The second support is attached to the frame of the extractor and rotatably attached to the first support. The pivotable attachment of the first support to the second support allows the first pinch wheel and second pinch wheel to be engaged or disengaged from one another. Rotation of the pinch wheels when engaged causes extraction of agricultural plastic inserted between the pinch wheels.

In some embodiments of the system, the winding device may include a reel. The reel may include a first side plate attached to a first portion of the frame of the winding device, and a second side plate attached to a second portion of the frame of the winding device. A first spool may extend from the first side plate, and a second spool may extend from the second side plate. The first portion of the frame and the second portion of the frame are pivotably connected so that the second spool can be moved away from the first spool by pivoting the second portion of the frame.

In some embodiments of the system, the mower may be a first mower configured to cut the crop bed plant material to a first height, and the system may also include a second mower configured to cut the plant material remaining in the crop bed after operation of the first mower. The second mower is configured to cut the plant material to a second height, the second height being lower than the first height.

In some embodiments of the disclosed system, the mower may include a drum attached to the frame thereof. A rotating flange may be attached to the drum, and the blades of the mower are a plurality of blades disposed along the perimeter of the flange.

In some embodiments of the disclosed system, the extractor may be configured such that the speed of rotation of the first pinch wheel and the second pinch wheel matches the over-the-ground speed of the extractor as the extractor travels along a crop bed.

In some embodiments of the disclosed system, the first side plate of the reel may include a first cutout and the second side plate of the reel may include a second cutout. The winding device may include a cord dispenser configured to dispense a length of cord through the first and second cutouts prior to winding the agricultural plastic. The densified roll of agricultural plastic prepared by the winding device may be bound using the length of cord extending between the side plates.

In some embodiments of the disclosed system, the winding device may include a guide assembly attached to the frame of the winding device. The guide assembly may include first and second pinch wheels, both rotatably attached to the guide assembly. The distance between the first pinch wheel and the second pinch wheel is preferably adjustable and the pinch wheels are configured to receive agricultural plastic therebetween.

In some embodiments of the system, a guide assembly may be attached to the frame of the winding device for guiding agricultural plastic onto the reel of the winding device as the reel is rotating. The guide assembly may be configured to move side to side along the width of the reel such that the agricultural plastics are wound uniformly onto the reel.

The present disclosure also includes a method for extracting embedded agricultural plastic from a crop bed. The method includes the steps of cutting the plant material with a mower, loosening the soil around the embedded agricultural plastic, pulling the embedded agricultural plastic free of the crop bed by feeding the agricultural plastic into the extractor head assembly of an extractor, depositing the extracted agricultural material on the surface of the crop bed, into a furrow alongside the crop bed, or both, using the extractor, and densifying the agricultural plastic deposited onto the surface of the crop bed by retrieving from the edge of field using a mechanical winding device.

In some embodiments of the disclosed method, the step of densifying the agricultural plastic into a readily transportable form may include the steps of engaging the agricultural plastic with a reel rotatably attached to the frame of the winding device, actuating the reel so that the agricultural plastic is wound therearound, retracting a first portion of the reel from a second portion of the reel, and allowing the agricultural plastic to fall from the reel.

In some embodiments of the disclosed method, the step of engaging the agricultural plastic with the reel may include the steps of positioning a portion of the agricultural plastic between a first portion of the reel and a second portion of the reel, and bringing the first portion of the reel together with the second portion of the reel to secure the agricultural plastic therebetween.

In some embodiments of the disclosed method, the first portion of the reel is a first spool and the second portion of the reel is a second spool. The step of retracting the second portion of the reel from the first portion of the reel includes the step of pivoting the second spool away from the first spool.

In some embodiments of the disclosed method, the step of loosening the soil around the embedded agricultural plastic is performed by the extractor.

In some embodiments of the disclosed method, the mower used to cut the material on the crop bed includes a first subframe and a second subframe. The two subframes are pivotably connected. The first subframe includes a first blade and the second subframe includes a second blade. The pivotable connection between the first subframe and the second subframe allows the subframes to conform to the surface profile of a crop bed during the mowing process.

BRIEF DESCRIPTION OF THE DRAWINGS

FIG. 2 is a top view of the components of a first-pass mower depicted in

FIG. 1.

FIG. 3 is a front view of the components of a first-pass mower depicted in

FIG. 1.

FIG. 4 is a side view of the components of a first-pass mower depicted in

FIG. 1.

DETAILED DESCRIPTION

Definitions

Agricultural plastics—as used herein, the term "agricultural plastics" refers to plastic materials used in and around a crop bed. Unless otherwise stated herein, the term "agricultural plastics" refers specifically to drip tape and plastic mulch.

Densifying—as used herein, the term "densifying" refers to the process of transforming material from a first, less dense form to a second, more dense form. The second, more dense form of material is a relatively clean, readily transportable form that is salable to a recycler or other entity.

The present system for extraction and densifying of agricultural plastics, such as drip tape and plastic mulch, preferably includes either three or four devices, each of which carry out certain steps in the overall process that make up the entire system. The system preferably includes one or more mowers used to cut plant material on a crop bed, an extractor system used to pull agricultural plastics from the crop bed and to deposit the material onto the crop bed in an easily wound form, and a winding device used to wind the agricultural plastics into a tight, salable product. While it is contemplated that various embodiments of the present system require three or four devices to carry out the processes described below, the individual devices described herein may be used individually, or in separate combinations other than those explicitly set forth herein, as determined by the needs of a user of those devices.

In general terms, the present system first includes one or more mowers used to eliminate or reduce plant material on a crop bed. The presence of plant material on the crop bed makes it more difficult to access the agricultural plastics on or in the crop bed, and also results in a greater likelihood that the agricultural plastics will break or tear in the process of removing them from the crop bed, thereby further increasing the difficulty of taking up the agricultural plastics and preparing them for transport and recycling. In the case of plastic mulch, the crop plants typically grow through openings in the plastic mulch, and if the crop plants are not at least partially cut prior to extracting the plastic mulch, the plant material is likely to cause the plastic mulch to tear. Once the plant material has been mowed to a desired length, through the use of one or more mowers, an extractor system is used to pull the agricultural plastics away from the remaining plant material, and away from the soil, rocks, and the like of the crop bed, and to deposit the plastics onto the crop bed and/or furrow in an easily wound form. Once the extraction process is complete, the agricultural plastics are preferably exposed along the surface of the crop bed. After extraction, a winding device is used to take up the agricultural plastics exposed on the crop beds, winding the material into a densely-packed, readily transportable product that is largely free of dirt and debris.

First-Pass Mower

Figure 1:
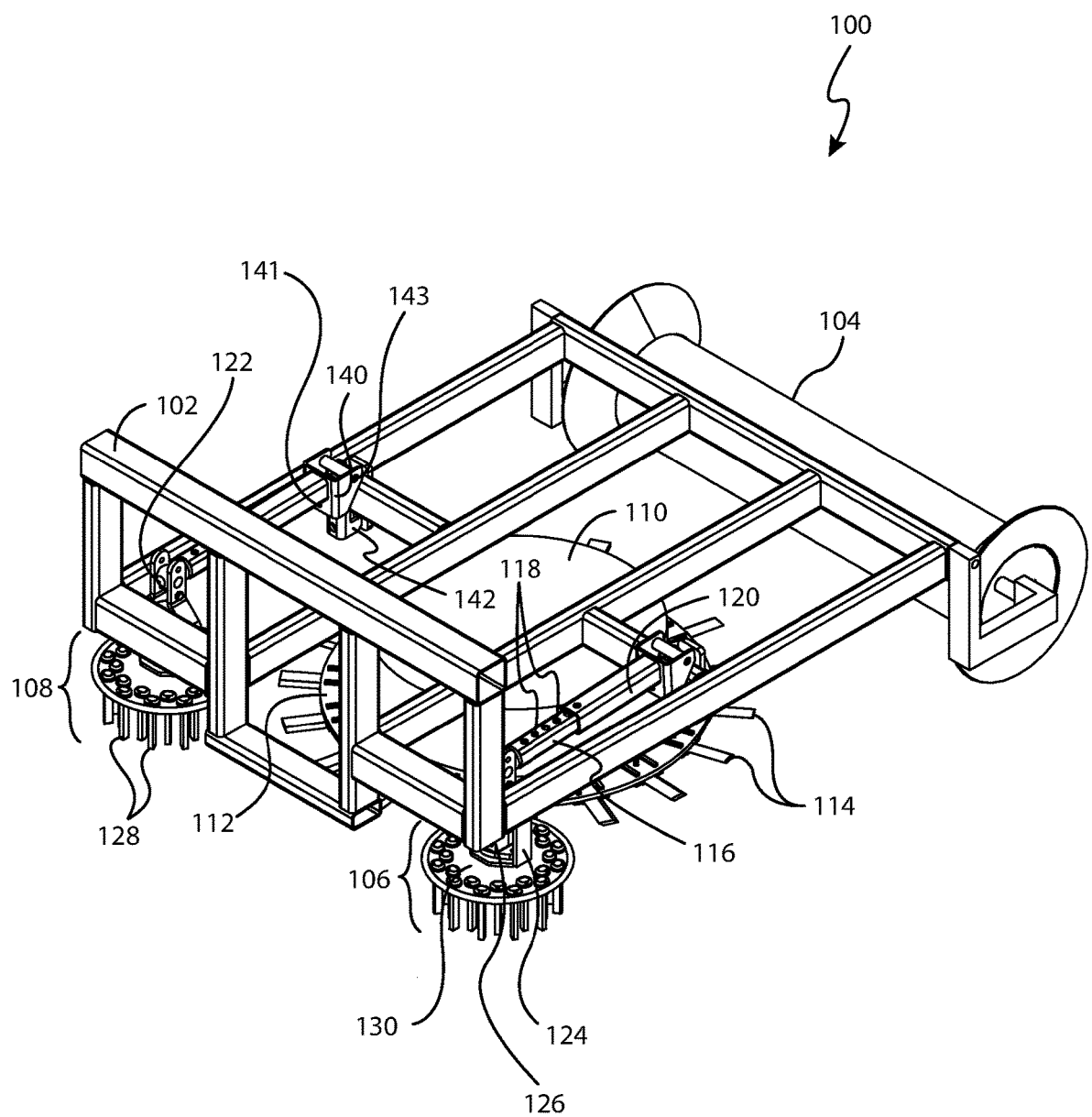
FIG. 1 is a perspective view of components of one embodiment of a first-pass mower of the present system.

Turning now to the drawings, wherein like numerals indicate like parts, the numeral 100 refers generally to a first-pass mower used in some embodiments of the present system wherein two separate mowers are used to cut plant material on a crop bed. FIG. 1 depicts components of a first-pass mower 100 of the present system. It should be noted that the term "Figure" and the abbreviation "FIG" are used interchangeably herein.

First-pass mower 100 includes a frame 102 that supports the various other components of the device. First-pass mower 100 may be self-propelled or, in the embodiment shown in the figures, designed to be pulled by a vehicle such as a tractor (not shown). Frame 102 may include an attachment 136 that allows first-pass mower 100 to be attached to the tractor. Attachment 136 may be part of a three-point hitch used to connect first-pass mower 100 to a tractor. Alternatively, any of a variety of connections, methods, and structures known in the art for connecting a device to be pulled by a tractor may be utilized. First-pass mower 100 is preferably configured to attach to a power take off (PTO) shaft of a tractor or other vehicle to provide power to first-pass mower 100.

First-pass mower 100 preferably includes four gauge wheels (not shown) of adjustable height. The gauge wheels travel in the furrows of the crop bed, and the adjustable height of the gauge wheels allows the user of first-pass mower 100 to adjust the vertical position of first-pass mower 100 in relation to the crop bed furrow, as needed according to the depth of the furrows. The vertical position of frame 102 relative to the crop bed is adjusted via a roller, as described below. It should be noted that the use of gauge wheels in association with a frame, as described, is known in the art, and the gauge wheels may be attached to frame 102 in any suitable manner, preferably extending from the structure shown in the figures such that the gauge wheels travel in the crop bed furrows. Height adjustment mechanisms for the gauge wheels are also known in the art.

First brush wheel 106 and second brush wheel 108 are rotatably attached to first-pass mower 100 and are positioned forward of the cutting mechanism (described in greater detail below) on either side of the mower. Each brush wheel 106 and 108 includes a hydraulic motor 126 that drives rotation of the respective brush wheel. Although the embodiment shown in the figures includes separate hydraulic motors for each brush wheel, it is contemplated that brush wheels 106 and 108 may be driven by a common motor. Each brush wheel 106 and 108 further includes a disc attached to first-pass mower 100 by a shaft 138 extending from, hydraulic motor 126 and through a clevis 124. The other end of clevis 124 is attached to a ball joint 122 affixed to frame 102. Shaft 138 extends downward from hydraulic motor 126 to disc 130 and imparts rotational movement from hydraulic motor 126 to disc 130. A plurality of fingers 128 extend downward from disc 130. During operation of first-pass mower 100, brush wheels 106 and 108 rotate, and fingers 128, sweep plant material upward to be cut by the mower. This process brings plant material hanging over the side of the crop bed into the bath of the blades of first-pass mower 100.

Blades 114 of first-pass mower 100 are affixed to a drum flange 112 extending along the perimeter of a wide-diameter rotating drum 110 that is rotatably attached to frame 102. The large diameter of drum 110 directs cut plant material away from the bed top and prevents plastic from winding around the rotating cutting structure.

As shown in the figures, brush wheels 106 and 108 are each affixed to a ball joint 122 that is attached to a first telescoping member 116. First telescoping member 116 includes a plurality of openings 118 along the length thereof, the length of first telescoping member being adjustably received into second telescoping member 120. The openings 118 in first telescoping member 116 are selectively alignable with an opening in second telescoping member 120, and when the two telescoping members are positioned at a desired relative position a pin or other structure may be inserted through the opening in second telescoping member 120 and through one of the openings 118 in first telescoping member 116, thereby fixing first telescoping member 116 at a desired position. In this way, a user of first-pass mower 100 is able to control the distance between brush wheels 106 and 108 and blades 114.

A roller 104 is attached to frame 102 and disposed rearward of the frame. As first-pass mower 100 travels along the length of a crop bed, roller 104 rolls along the top of the bed. Roller 104 maintains a minimum distance between the top of the crop bed and blades 114 of first-pass mower, and also helps to maintain the proper central position of first-pass mower 100 as it passes along the length of the crop bed. As the depths of the crop bed furrows change, or the surface profile of the crop bed itself changes, roller 104 causes first-pass mower 100 to rise or fall along with those changes in depth or profile. It is contemplated that in some embodiments of first-pass mower 100 the height of roller 104 may be adjustable, so that the user of first-pass mower 100 may set the minimum distance between the crop bed and blades 114 as necessary or desired for a given use of first-pass mower 100.

Figure 2:
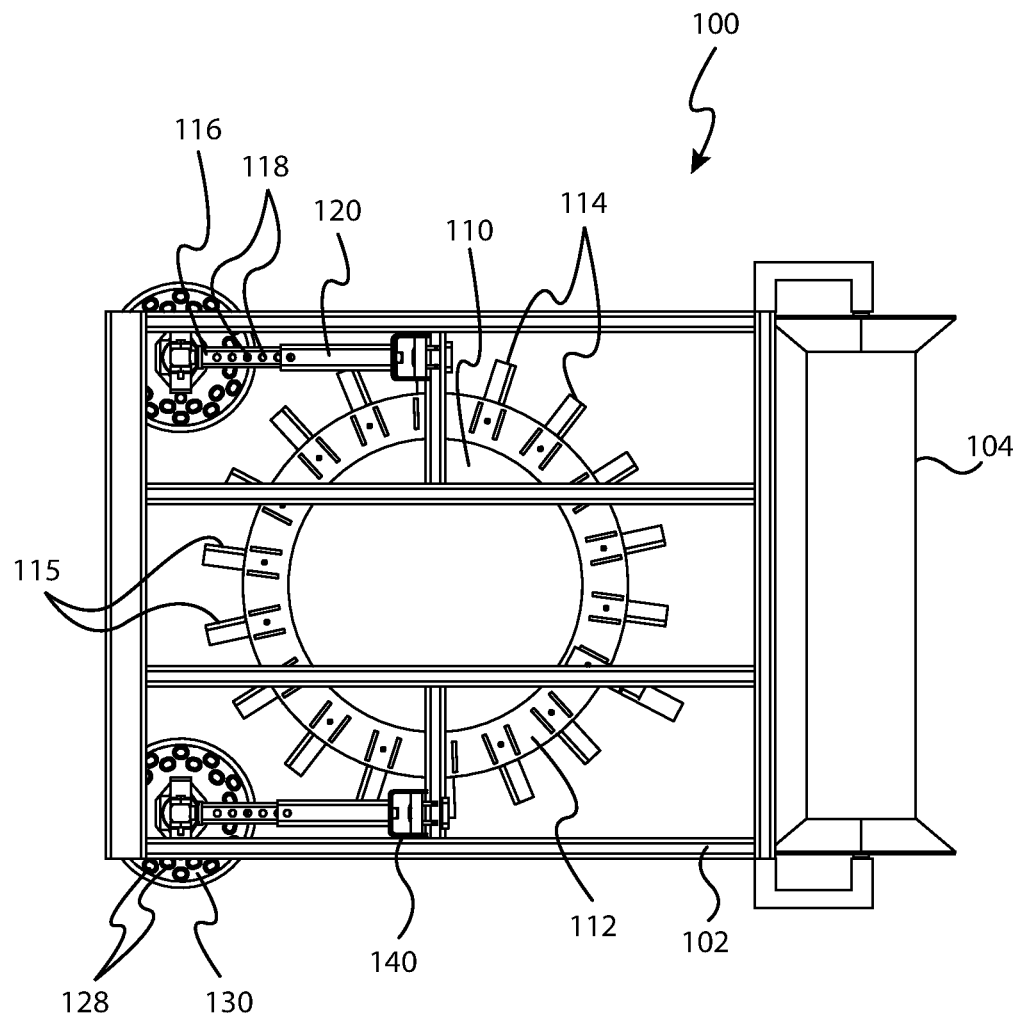

FIG. 2 provides a top view of first-pass mower 100. Frame 102 is depicted, along with the relative positions of drum 110 and roller 104. As can be seen in the figure, second telescoping member 120 is affixed to an adjustable attachment 140 that allows the attachment of second telescoping member 120 to frame 102. A second attachment 142 (shown in FIG. 4) is affixed to frame 102. Attachment 140 includes a threaded opening 141 positioned beneath second telescoping member 120. A screw (not shown) may be threaded through opening 141 such that it contacts the surface of attachment 142. Rotation of the screw adjusts the position of attachment 140 relative to attachment 142, and raises or lowers the height of the corresponding brush wheel as attachment 140 rotates about pivot 143. It is contemplated that in other embodiments of first-pass mower 100, a pin or other structure may be used to secure attachment 140 to attachment 142 at varying locations so that a user of first-pass mower 100 may adjust the height of one or both of brush wheels 106 and 108 as necessary or desired according to the characteristics of the crop bed on which first-pass mower 100 is being used. In the view shown in the figure, drum 110 travels in a counter-clockwise manner, and sharp leading-edges 115 of blades 114 are shown.

Figure 3:
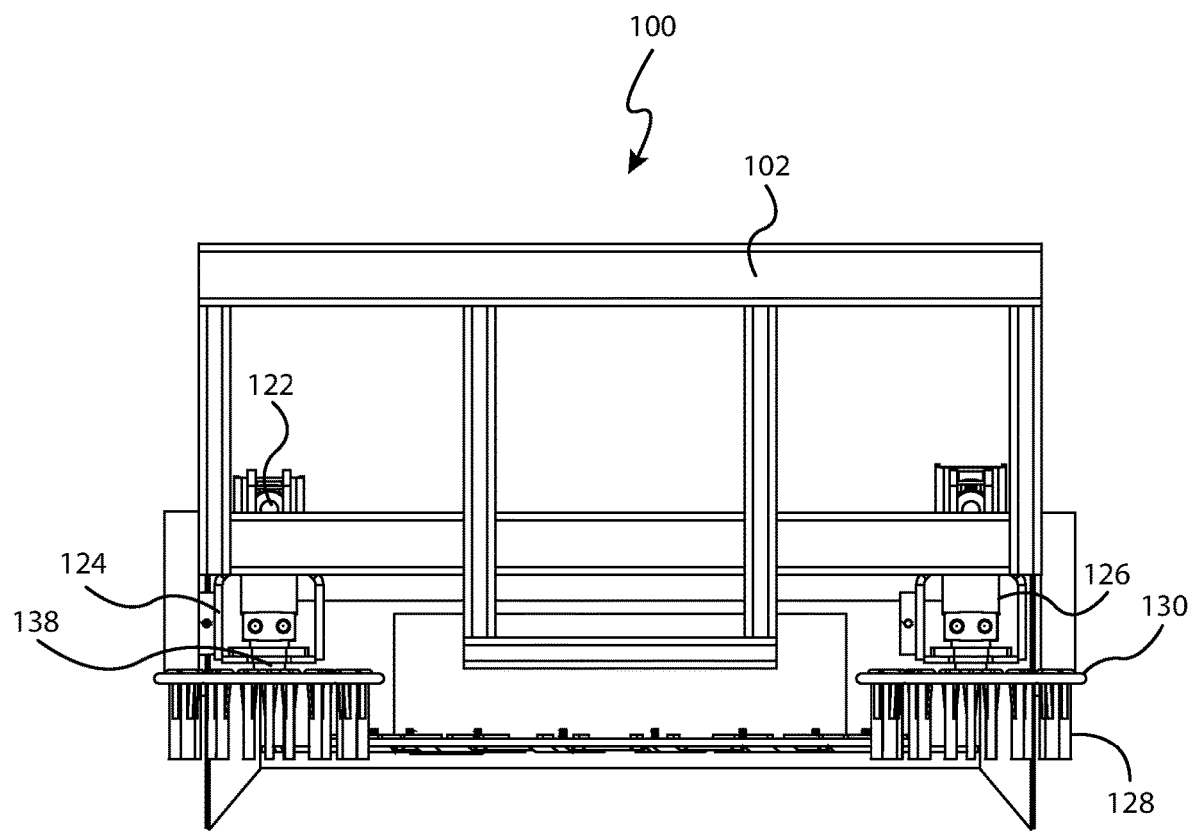

FIG. 3 is a front view of first-pass mower 100. Greater detail is shown with respect to the attachment of brush wheels 106 and 108 to the device. Hydraulic motors 126 are depicted, with shafts 138 extending therefrom to discs 130. Fingers 128 are shown extending from discs 130, and the clevis structures 124 used to attach the respective brush wheels to ball joints 122 are also shown. Ball joints 122 allow for forward, rearward, and side to side angling of brush wheels 106 and 108. Fingers 128 may be plucking fingers constructed of rubber or a suitable synthetic polymer. It is contemplated that other brush or finger structures may be utilized on discs 130 to brush plant material from the side of the crop bed into the path of blades 114.

Figure 4:
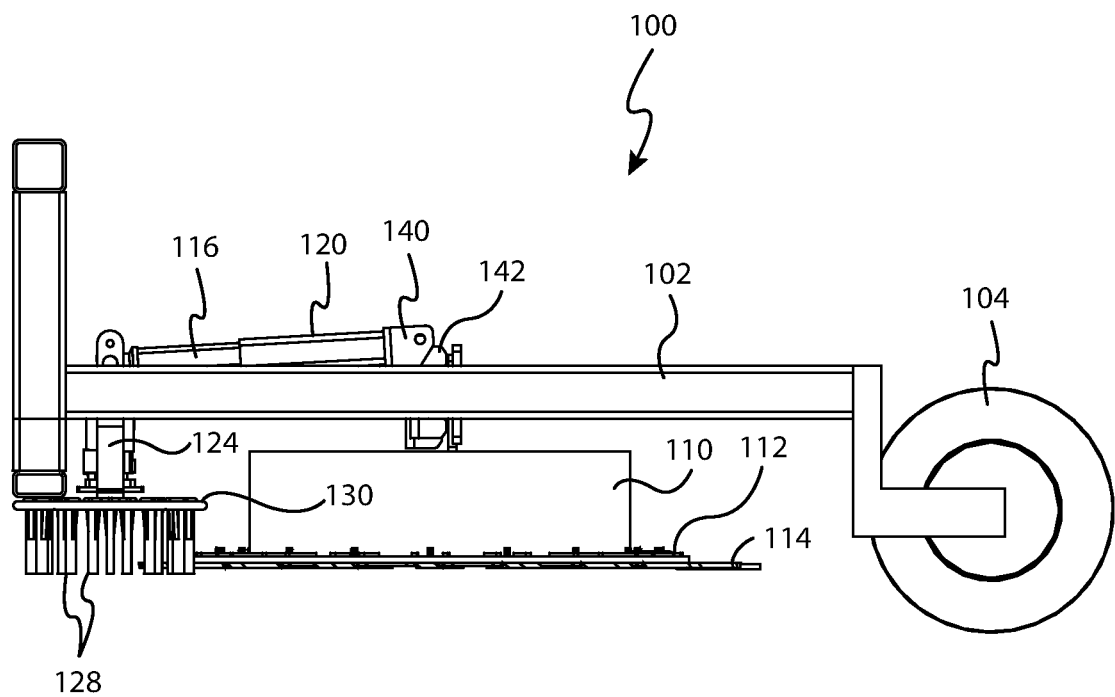

FIG. 4 is a side view of first-pass mower 100 showing the relative positioning of various components thereof. As shown, the bottom of fingers 128 extend below the level of blades 114, allowing brush wheels 106 and 108 to sweep plant material hanging over the side of the crop bed, below the reach of blades 114.

Figure 5:
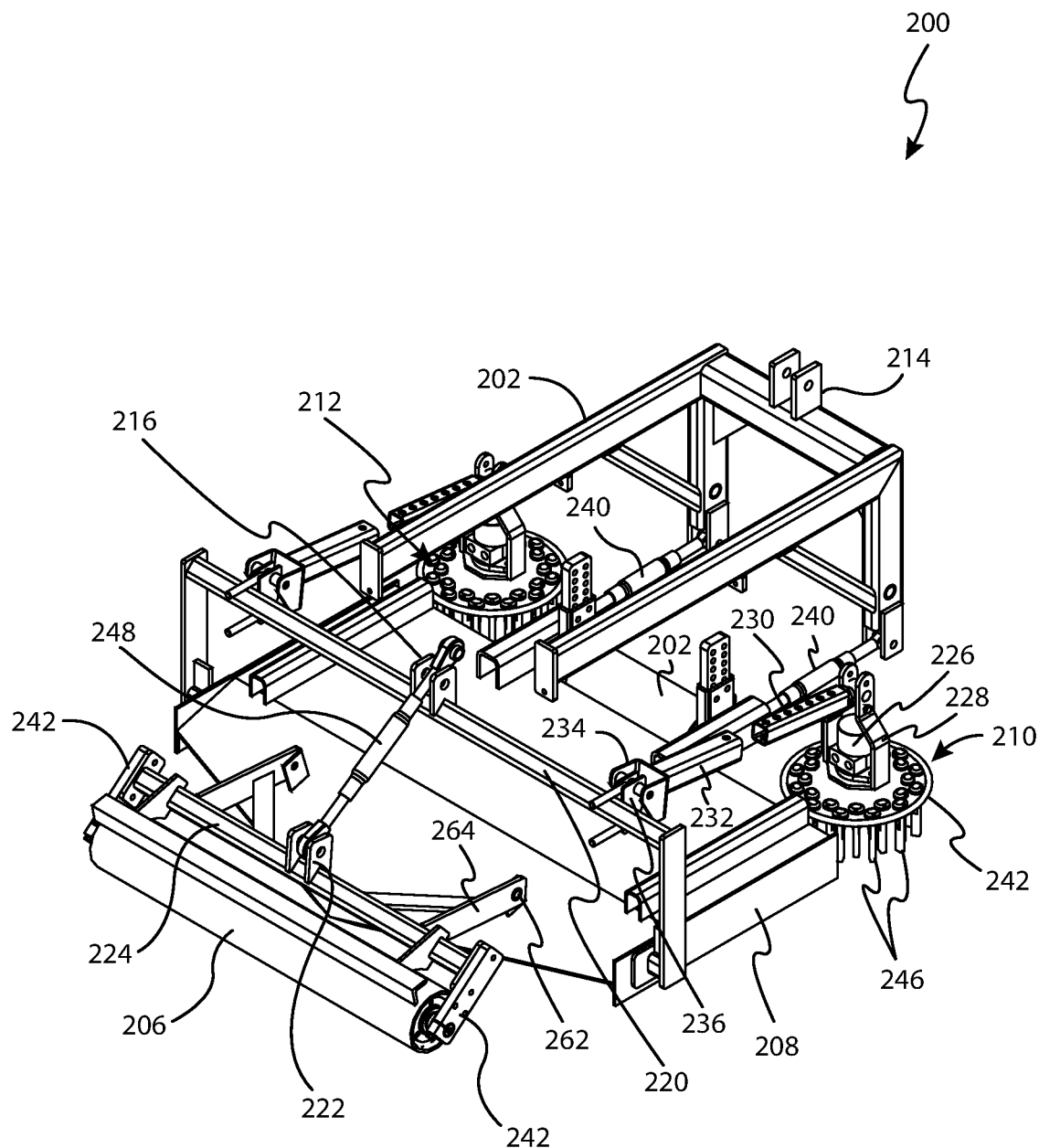
FIG. 5 is a rear and side perspective view of one embodiment of a second-pass mower of the present system.

First-pass mower 100 performs the initial cutting of plant material on the plant bed. The height of blades 114 is preferably set such that the first-pass mower does not cut through plastic mulch, drip tape, or other agricultural plastics found in the crop bed. After first-pass mower 100 has traveled along the length of a crop bed, it is desirable to utilize a second-pass mower 200 to perform more precise cutting operations and to eliminate as much additional plant material as possible prior to extraction of agricultural plastics. FIG. 5 provides a rear perspective view of one embodiment of second-pass mower 200.

Second-Pass Mower

As shown in FIG. 5, second-pass mower 200 includes a frame 202 that supports the various components of the mower. An attachment 214 is utilized to attach second-pass mower 200 to a tractor or other vehicle that will pull second-pass mower 200 along a crop bed. It is contemplated, however, that some embodiments of second-pass mower 200 may be self-propelled. Attachment 214 may be used to attach second-pass mower 200 to a tractor as part of a three-point hitch. Alternatively, any suitable method of connection may be utilized. Second-pass mower 200 shares certain structure with first-pass mower 100, described above. For example, first brush wheel 210 and second brush wheel 212 are provided forward of the blades of second-pass mower 200 to sweep plant material hanging over the side of the crop bed into the path of the blades. Each of brush wheels 210 and 212 includes a disc 242 and a plurality of fingers 246 extending downward therefrom, and each includes a hydraulic motor 226 to power rotation of discs 242. Each brush wheel 210 and 212 is adjustably attached to second-pass mower 200 via telescoping members and height-adjustable attachments, each of which operate in the same manner as described with respect to first-pass mower 100, above, and therefore will not be described in detail here. Second-pass mower 200 preferably includes both a front roller 204 and a rear roller 206, both of which serve to ensure that the blades of second-pass mower 200 are maintained at a desired minimum height over the surface of the crop bed, and that second-pass mower 200 remains properly centered along the crop bed. The use of two rollers provides greater precision and accuracy with respect to the maintenance of proper blade height relative to the crop bed and maintaining proper travel of the mower thereover. Rear roller 206 of second-pass mower 200 is rotatably attached to second-pass mower 200 via an axle (not shown) rotating between a pair of arms 242. A crossarm 224 extends between arms 242, and an attachment 222 is positioned midway along the length of crossarm 224. In the embodiment of second-pass mower 200 shown in the figures, a turnbuckle 248 extends between attachment 222 and an attachment 216 affixed to frame 202 of second-pass mower 200. Turnbuckle 248 allows for the adjustment of tension between frame 202 and rear roller 206. Arms 264 extending from the rear roller assembly pivots around pivot 262. Although not shown in the drawings, it is preferred that one or more chains extend from an upper portion of frame 202 to the mowing deck of mower 200 (preferably attached at one or more points along the surface of shroud 208). The chains are used to lift the mower deck for transport. When second-pass mower 200 is in use, the chains are preferably slack in order to allow the mowing deck of mower 200 to float across the top of the crop bed at a height and position determined by the front and rear rollers. Thus, when in operation the height of the blades of second-pass mower 200 is controlled solely by the front and rear rollers 204 and 206.

Figure 6:
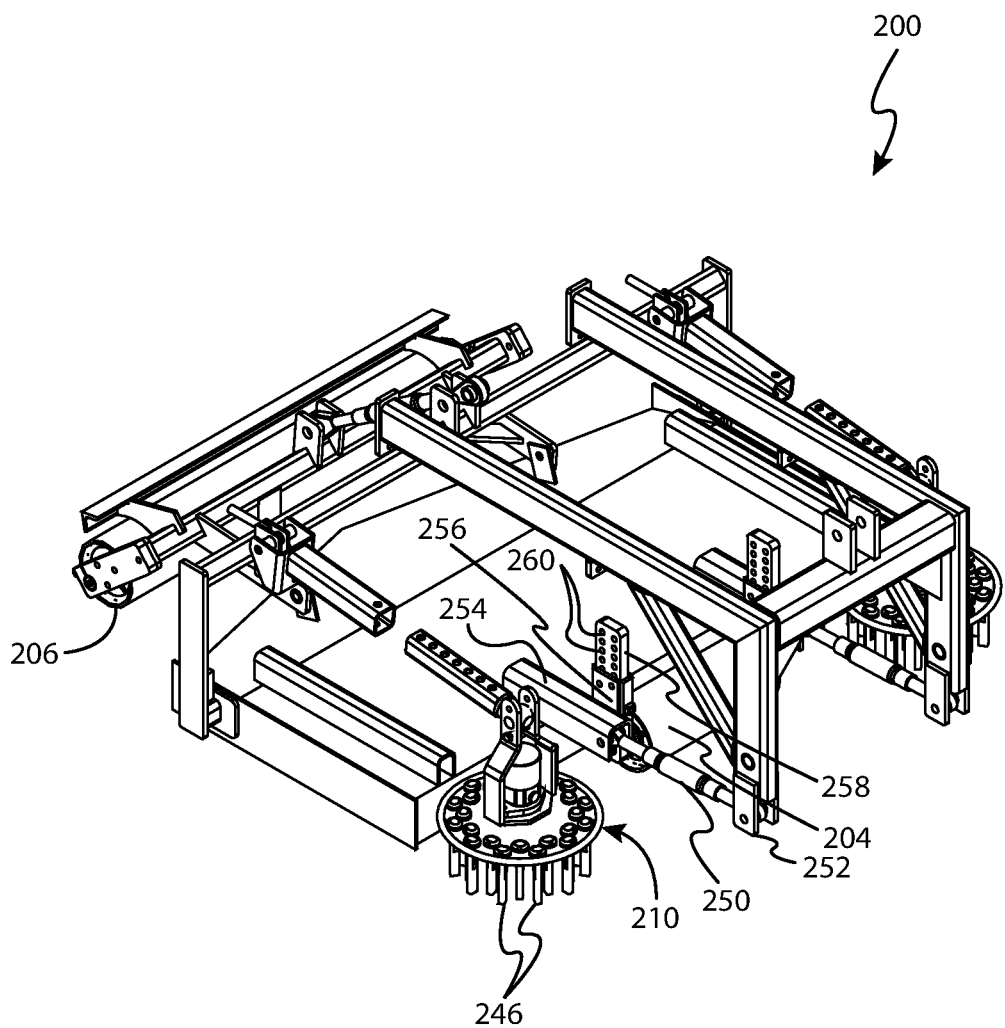
FIG. 6 is a front and side perspective view of the second-pass mower of FIG. 5.

FIG. 6 provides a front perspective view of second-pass mower 200, affording a better view of some of the structural features thereof. As can be seen, front roller 204 is shorter in width than rear roller 206, traveling over only a central portion of the surface of a crop bed rather than extending along a greater width thereof. Front roller 204 is attached to a rotating axle (not shown) associated with an attachment 258 having a plurality of openings 260 defined along the length thereof. One such attachment 258 is present at each end of roller 204. Attachments 258 are received by sheaths 256, each of which also include openings defined therein. It can be seen that adjusting the position of attachments 258 relative to sheaths 256 allows a user of second-pass mower 200 to adjust the position of front roller 204. Once a desired position of front roller 204 is achieved, a user of second-pass mower 200 can lock attachments 258 into place by inserting a pin or other structure through the openings in sheaths 256 and into openings 260 of attachments 258. In this manner, the user can control the minimum distance between the blades of second-pass mower 200 and the surface of the crop bed. As also shown in FIG. 6, adjacent the adjustment structures for front roller 204, and at both sides thereof, attachments 254 are present. Attachments 254 are fixed to first ends of links 250. Second ends of links 250 are affixed to attachments 252, which are in turn attached to frame 202. Attachments 254 are, in turn, affixed to frame 202. Links 250 allow for side to side motion of second-pass mower 200 such that the mower is encouraged to follow the crop bed. Links 250 also pull the mower along in field operation.

Figure 7:
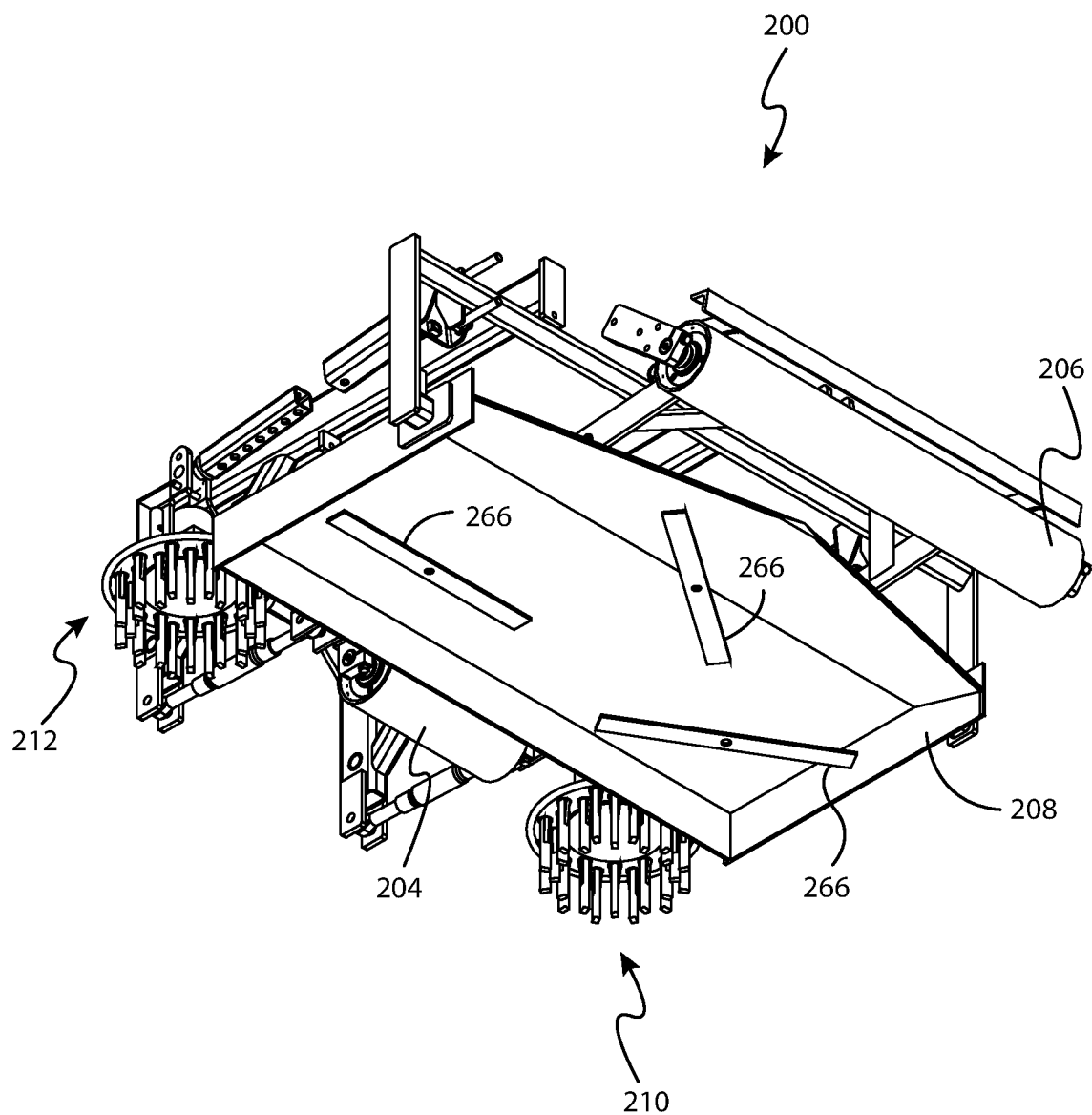
FIG. 7 is a bottom and rear perspective view of the second-pass mower of FIG. 5.

FIG. 7 provides a bottom perspective view of second-pass mower 200. Various components of second-pass mower 200 described above are visible in the drawing. Also visible are three rotating blades 266 disposed beneath shroud 208. Rotating blades 266 are positioned so as to describe overlapping arcs, and timed in such a manner so as not to interfere with one another during operation of second-pass mower 200. Blades 266 allow for a close cut of a significant portion of the plant material left in the crop bed by first-pass mower 100, without cutting into plastic mulch, drip tape, or other agricultural plastics disposed within the crop bed. Blades 266 are preferably flat, straight blades that pass over plastic mulch and other agricultural plastics without lifting them from the crop bed.

Figure 8:
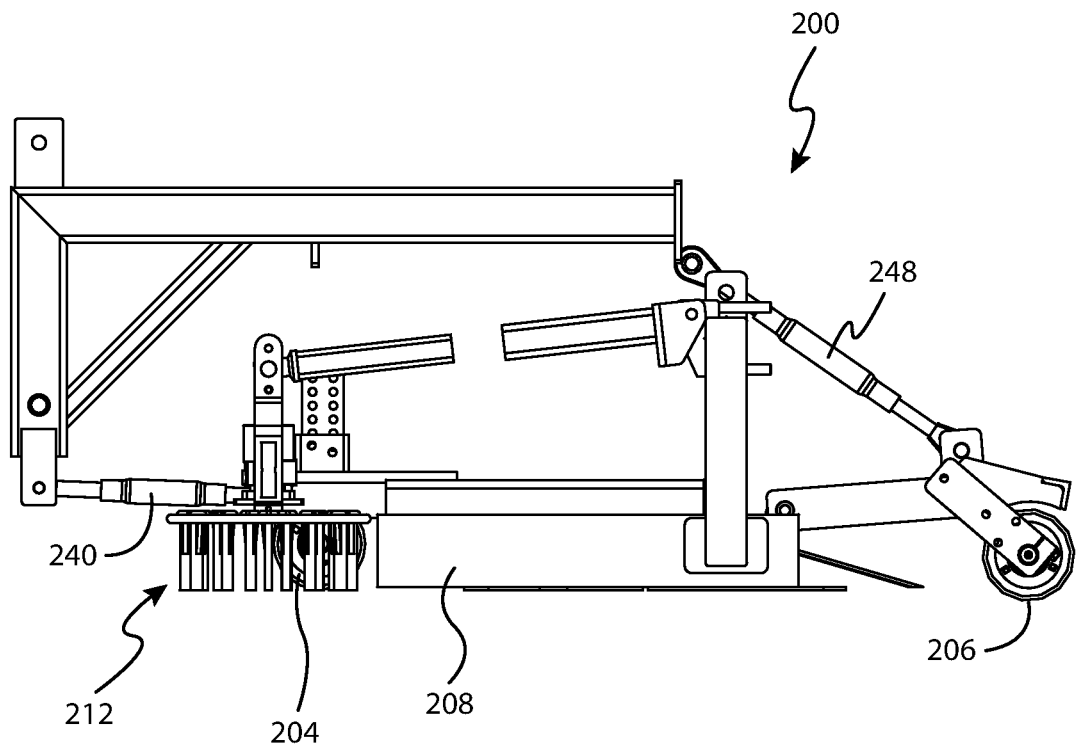
FIG. 8 is a side view of the second-pass mower of FIG. 5.

FIG. 8 provides a side view of an embodiment of second-pass mower 200. Various features of second-pass mower 200 described above are visible in the drawing, including shroud 208, rear roller 206, front roller 204, second brush wheel 212, and link 240.

Figure 9:
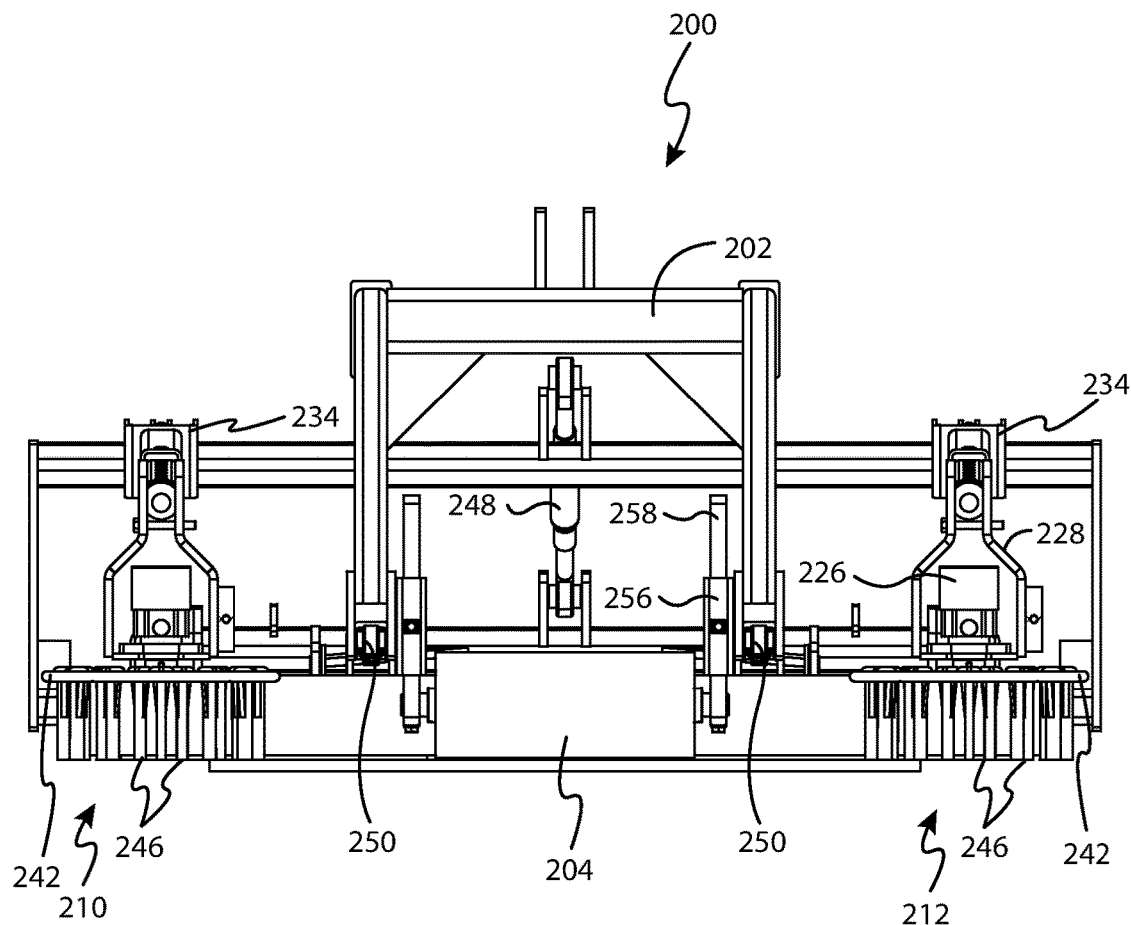
FIG. 9 is a front view of the second-pass mower of FIG. 5.
Figure 10:
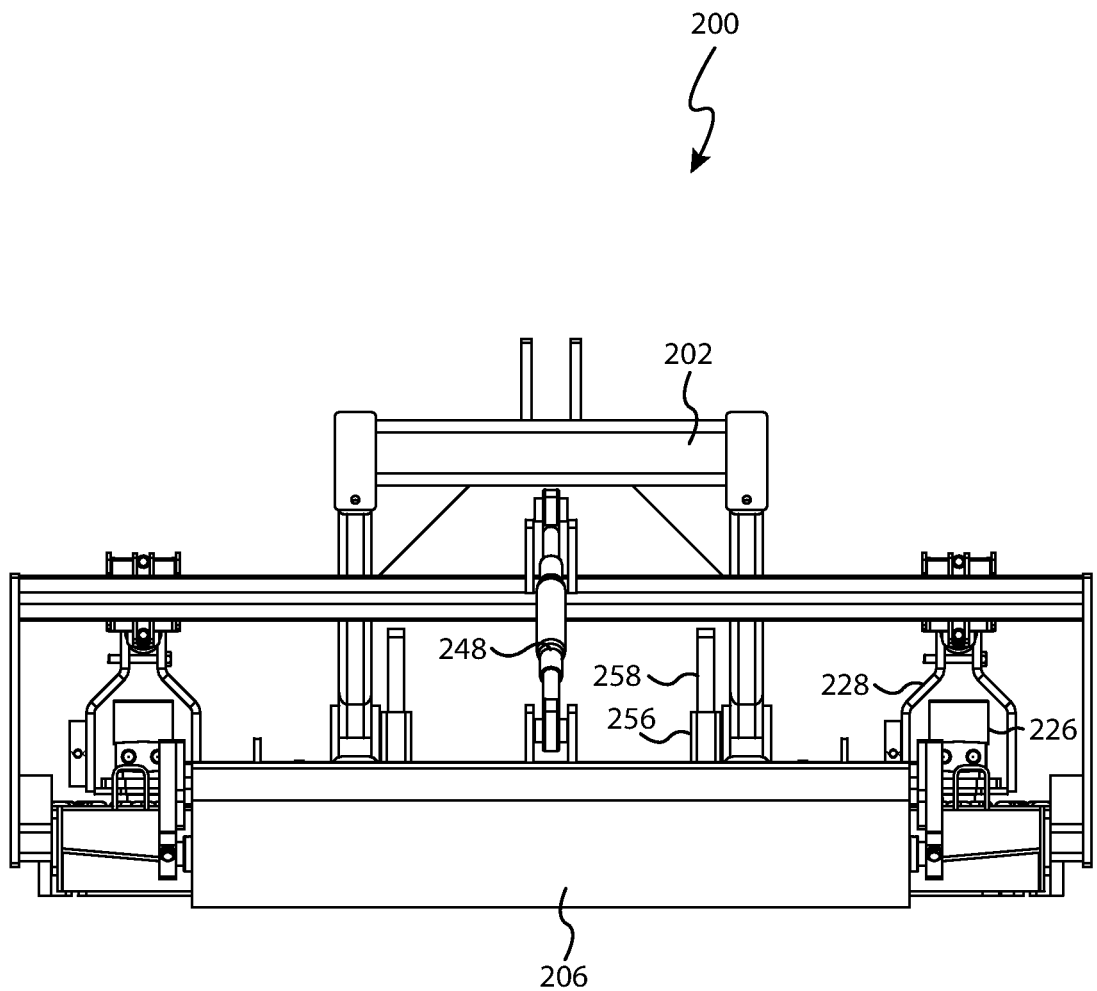
FIG. 10 is a rear view of the second-pass mower of FIG. 5.

FIGS. 9 and 10 show front and rear views of second-pass mower 200, respectively, including structures described with respect to FIGS. 5 through 7, above.

It is contemplated that the second-pass mower will also include adjustable gauge wheels, such as described with respect to the first-pass mower, and that the attachment of such gauge wheels to the structure shown in the drawings is within the capabilities of one of ordinary skill in the art.

Single-Pass Mower

Figure 11:
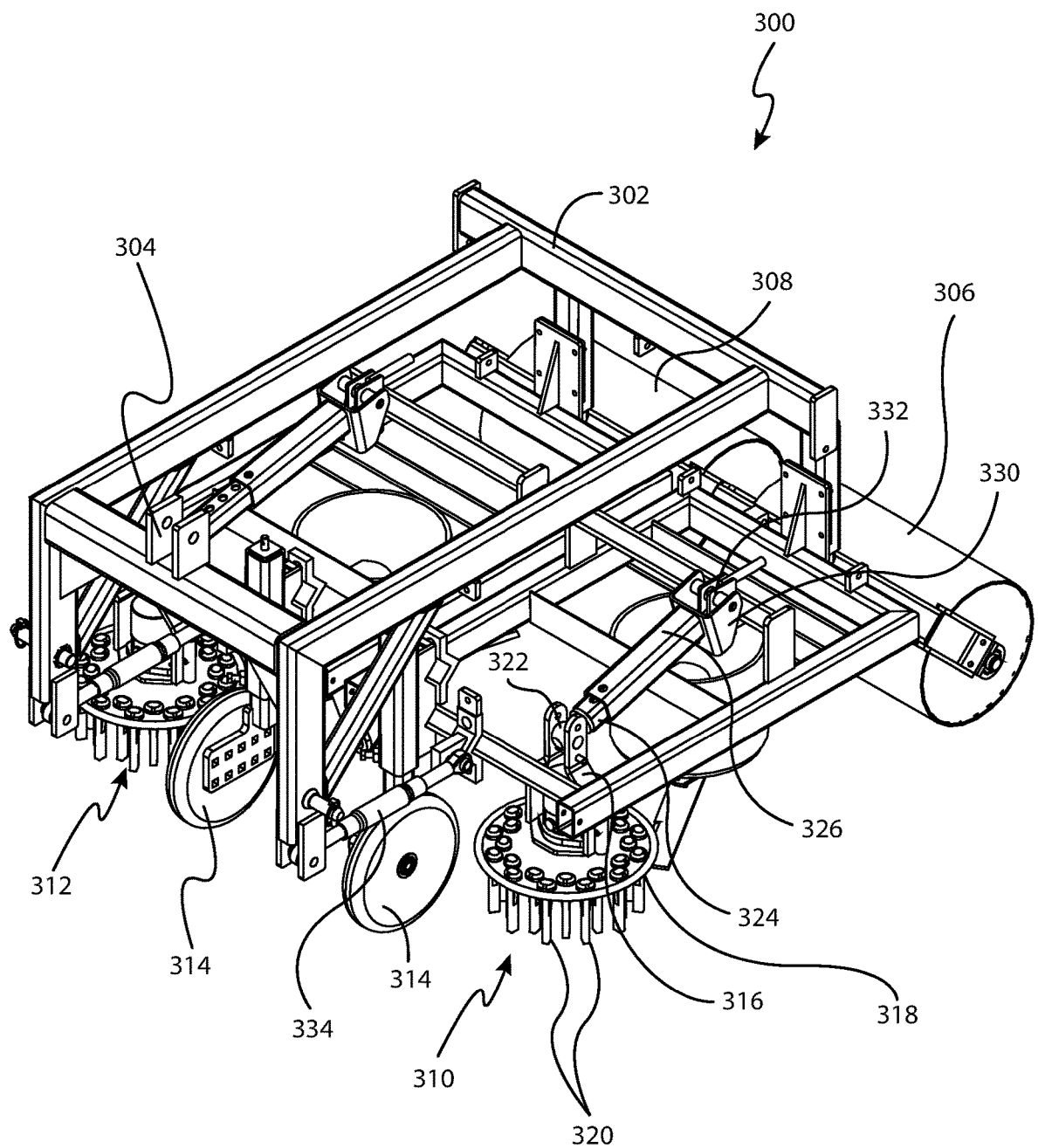
FIG. 11 is a front and side perspective view of components of a single-pass mower of the present system.

FIG. 11 provides a perspective view of one embodiment of a single-pass mower 300 of the present system. Single-pass mower includes an attachment 304 for attaching single-pass mower 300 to a vehicle such as a tractor. Attachment 304 may be used to attach single-pass mower 300 to a tractor as part of a three-point hitch or other suitable attachment structure. Some embodiments of single-pass mower may also be self-propelled. Single-pass mower 300 is preferably configured to engage a PTO shaft of a tractor to provide power to the various components of single-pass mower 300.

Single-pass mower 300 includes a frame 302 on which the various components of the mower are disposed. Single-pass mower 300 includes two adjustable-height gauge wheels 314 positioned interior to the device. Gauge wheels 314 travel along the surface of a crop bed responding to the horizontal profile thereof. Gauge wheels 314 preferably travel between lines of plants. The gauge wheels move up or down with the profile of the crop bed, causing a corresponding up or down movement of the cutting mechanism of single-pass mower 300, which is described in greater detail below. Also shown in FIG. 11 are first brush wheel 310 and second brush wheel 312, each of which includes a disc 318 and a plurality of fingers 320. Each brush wheel includes a hydraulic motor that drives a shaft attached to the disc 318, thereby imparting rotational motion to disc 318. The attachment of first and second brush wheels 310 and 312 is as described above with respect to the first-pass mower 100 and second-pass mower 200, with each brush wheel assembly including a clevis 316 attached to a ball joint 322. The ball joint is attached to a first telescoping member 324, which is receivably engaged with a second telescoping member 326, the relative position of the first telescoping member within the second telescoping member determining the distance at which first and second brush wheels 310 and 312 are positioned away from the blades of single-pass mower 300. This positioning of the first and second brush wheels 310 and 312 can be locked into place via a pin or other structure inserted through openings in the first and second telescoping members. Attachments 330 and 332 are provided to allow the height of first and second brush wheels 310 and 312 to be adjusted as described with respect to the single-pass and second-pass mowers, above. At the rear of single-pass mower 300 are first rear roller 306 and second rear roller 308, which are better shown in FIG. 12.

Figure 12:
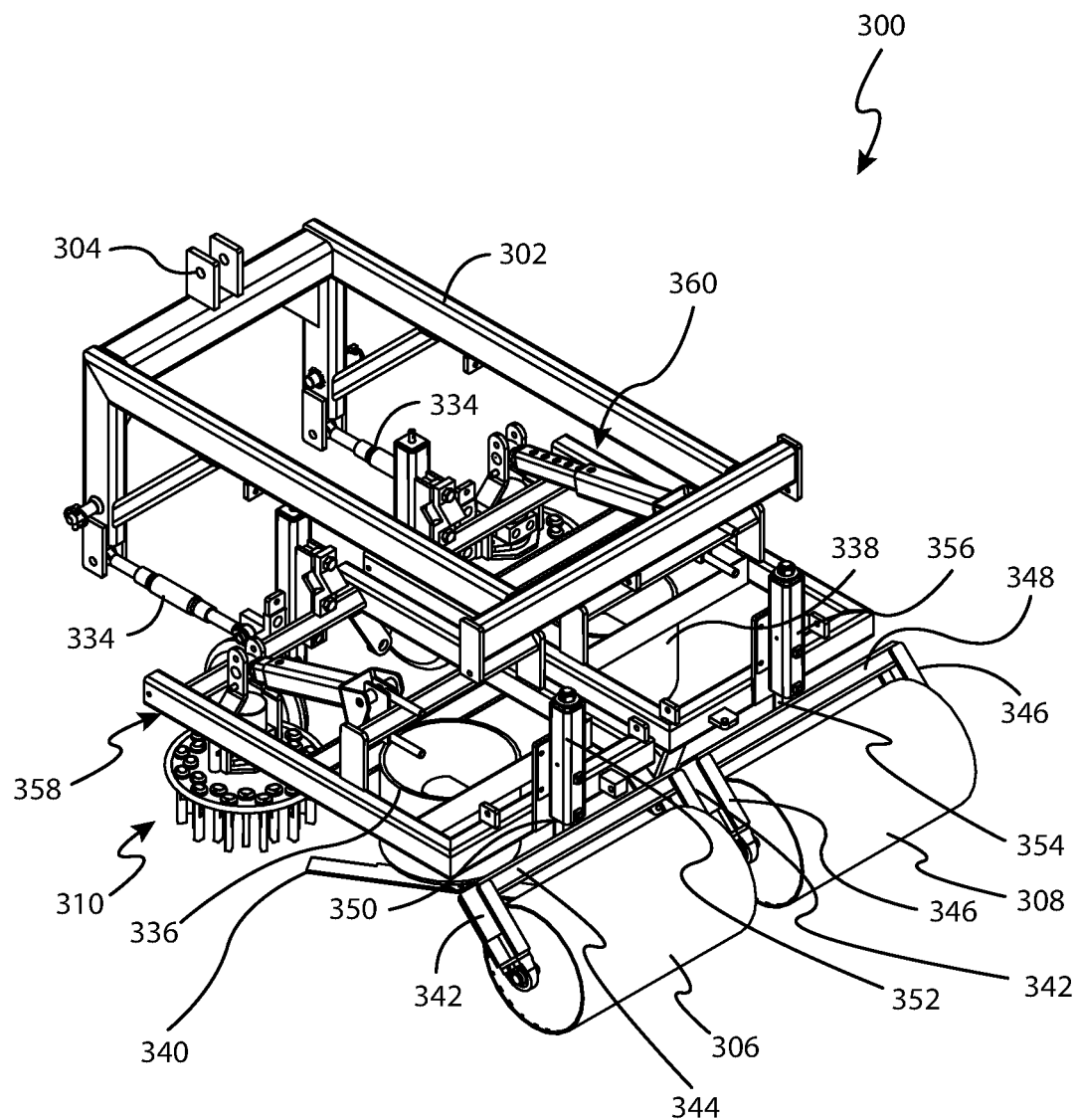
FIG. 12 is a rear and side perspective view of the components of a single-pass mower depicted in FIG. 11.

FIG. 12 is a rear perspective view of single-pass mower 300. Various structures described with respect to FIG. 11, above, are visible from this view. In addition, FIG. 12 provides a better view of first rear roller 306 and second rear roller 308. Each of first rear roller 306 and second rear roller 308 rotates on an axle (not shown). The axle of first rear roller 306 extends between a pair of arm assemblies 342. A crossarm 344 extends between the two arm assemblies 342 and is attached, midway along its length, to a first telescoping member 350. First telescoping member is adjustably received into second telescoping member 352 such that a user of single-pass mower may adjust the height of first rear roller 306 with respect to the remainder of the mower. Second rear roller 308 has the same general structure, with its axle extending between a pair of arm assemblies 346. A crossarm 348 extends between the arm assemblies and is attached midway along its length to a telescoping arm 354 adjustably received within sheath 356. A user of single-pass mower 300 can adjust the height of second rear roller 308 with respect to the remainder of the mower. Once the heights of the first and second rear rollers 306 and 308 are set, a pin or other structure can be used to lock the telescoping arms in place.

While single-pass mower 300 has been described as having a frame 302, above, it should be noted that each of the first and second rear rollers 306 and 308 has its own subframe, identified as elements 358 and 360, respectively. It is to the subframes that each of the first and second brush wheels 310 and 312, each respective mower blade, and other components of the device, are attached. One or more chains (not shown) preferably extend from an upper portion of frame 302 to the individual subframes 358 and 360. As with second-pass mower 200, the chains are utilized to lift the mower deck during transport and are kept slack during operation of single-pass mower 300. Maintaining slack in the chains during operation allows the subframes and their various components to float above the surface of the crop bed at a height determined by a subframe's respective rear roller 306 or 308 and front gauge wheels 312 and 314.

Figure 13:
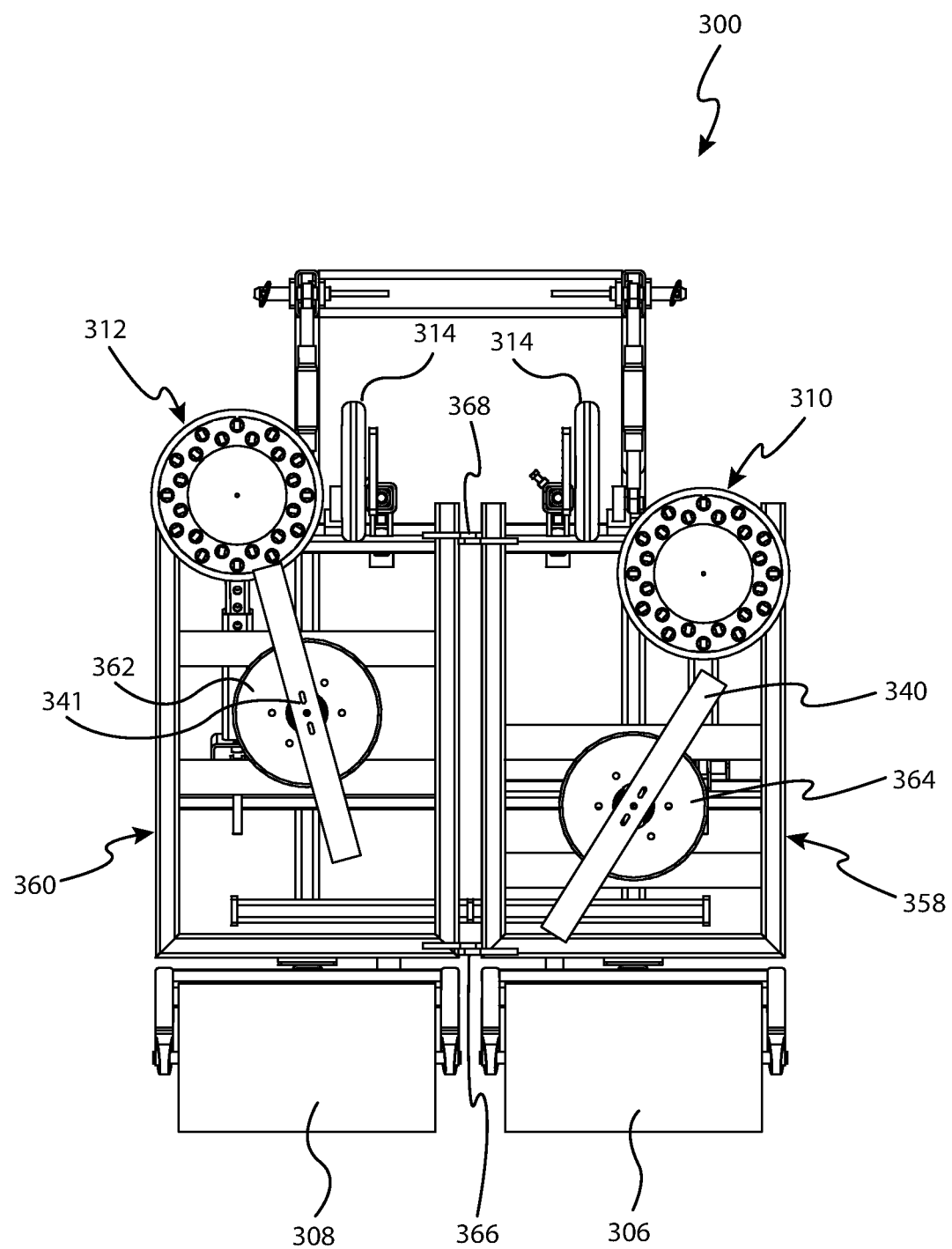
FIG. 13 is a bottom view of the components of a single-pass mower depicted in FIG. 11.

FIG. 13 is a bottom view of single-pass mower 300 that provides a better view of subframes 358 and 360, as well as the various components disposed thereon. As can be seen, for example, each of brush wheels 310 and 312, and each mower blade, is positioned on its own subframe, and each may be located in a different position along the length of single-pass mower 300. The cutting mechanism employed by single-pass mower 300 includes rotating drums 362 and 364, each of which has a blade (340 and 341, respectively) attached thereto. The positions of rotating drums 362 and 364 may also be independently adjusted along the length of single-pass mower 300. Subframes 358 and 360 are connected at two pivot points, designated as pivot 366 and 368. These pivots allow each subframe 366 and 368 to move independently along one another as single-pass mower 300 travels along the surface of a crop bed. The ability of each subframe 366 and 368 to adjust independently to the contours of a crop bed results in a more consistent, accurate mowing of the crop bed, particularly in the case of crop beds where there may be a great degree of inconsistency in surface profile across the width of the bed. This independent adjustment is particularly useful when mowing crown-shaped crop beds. Although each subframe is shown as having a single blade associated therewith, it is contemplated that one or both of the subframes may include more than one blade.

Figure 14:
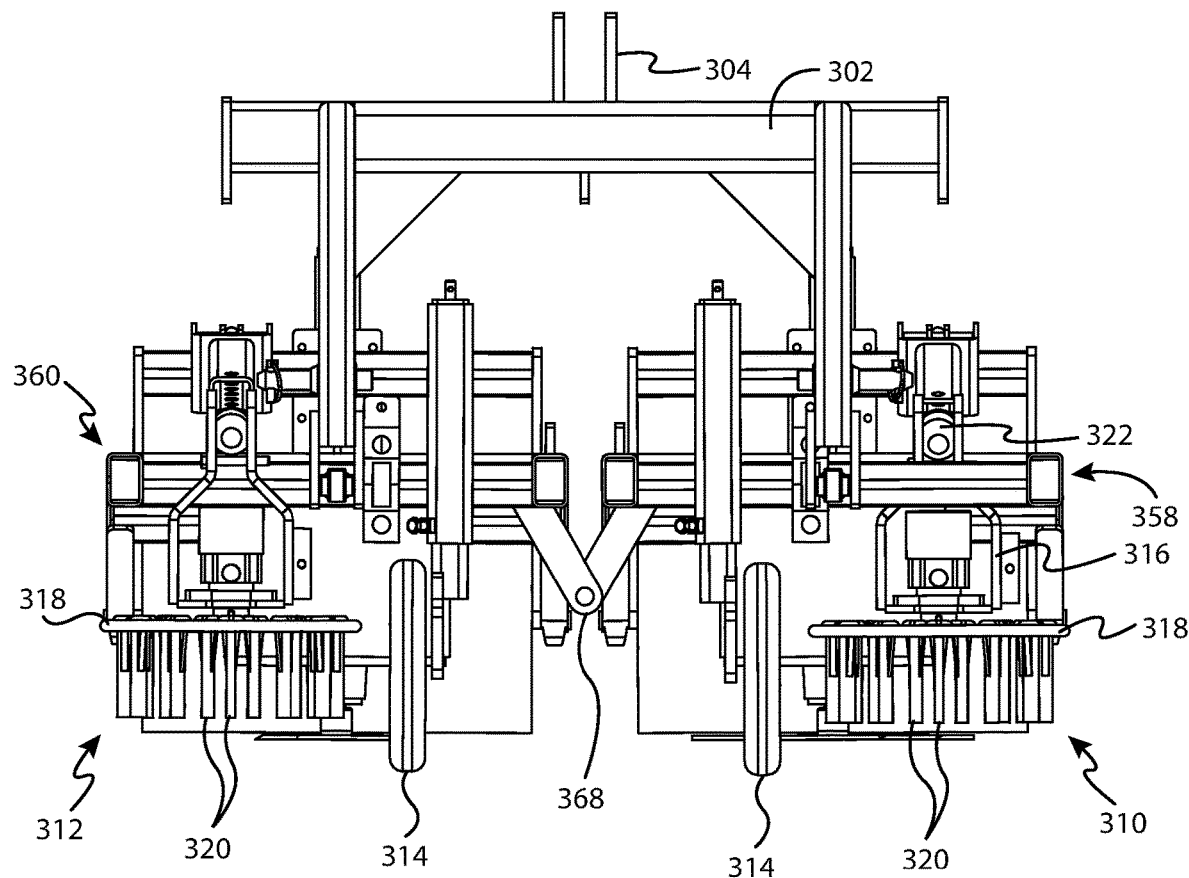
FIG. 14 is a front view of the components of a single-pass mower depicted in FIG. 11.

FIG. 14 provides a front view of single-pass mower 300. Shown are gauge wheels 314, first and second brush wheels 310 and 312, discs 318, clevises 316, ball joints 322, and fingers 320. Also shown in the view are frame 302 and attachment 304. Subframes 358 and 360 are also indicated in the drawing. Pivot 368 is shown at the juncture of two arms connecting subframes 358 and 360. Pivot 368 allows free rotation at the connecting point of the two arms extended from the respective subframes. Thus, as a gauge wheel 314 and a rear roller associated with a given subframe moves up or down in response to the surface profile of one side of the crop bed, the corresponding subframe, as well as the components attached thereto, moves accordingly.

Figure 15:
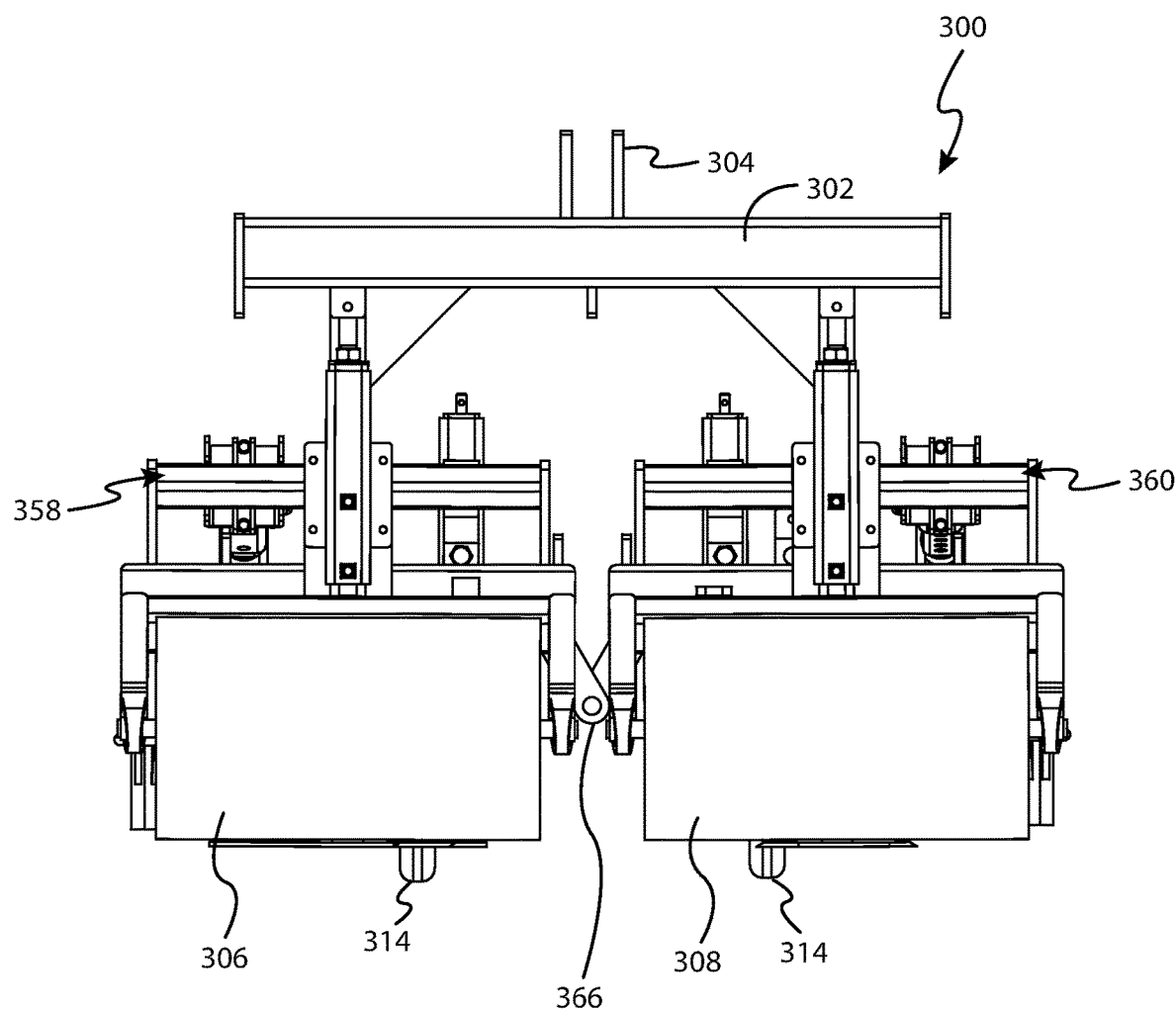
FIG. 15 is a rear view of the components of a single-pass mower depicted in FIG. 11.

FIG. 15 provides a rear view of single-pass mower 300. This provides another view of the various components of single-pass mower 300, the details of which are provided above. Also visible in FIG. 15 are a pair of arms extending from subframes 358 and 360 to join at pivot 366. Pivot 366 allows free rotation at the connection point of the two arms, thus, along with pivot 368, allowing the subframes 358 and 360 to respond independently to changes in the surface profile on either side of the crop bed.

Figure 16:
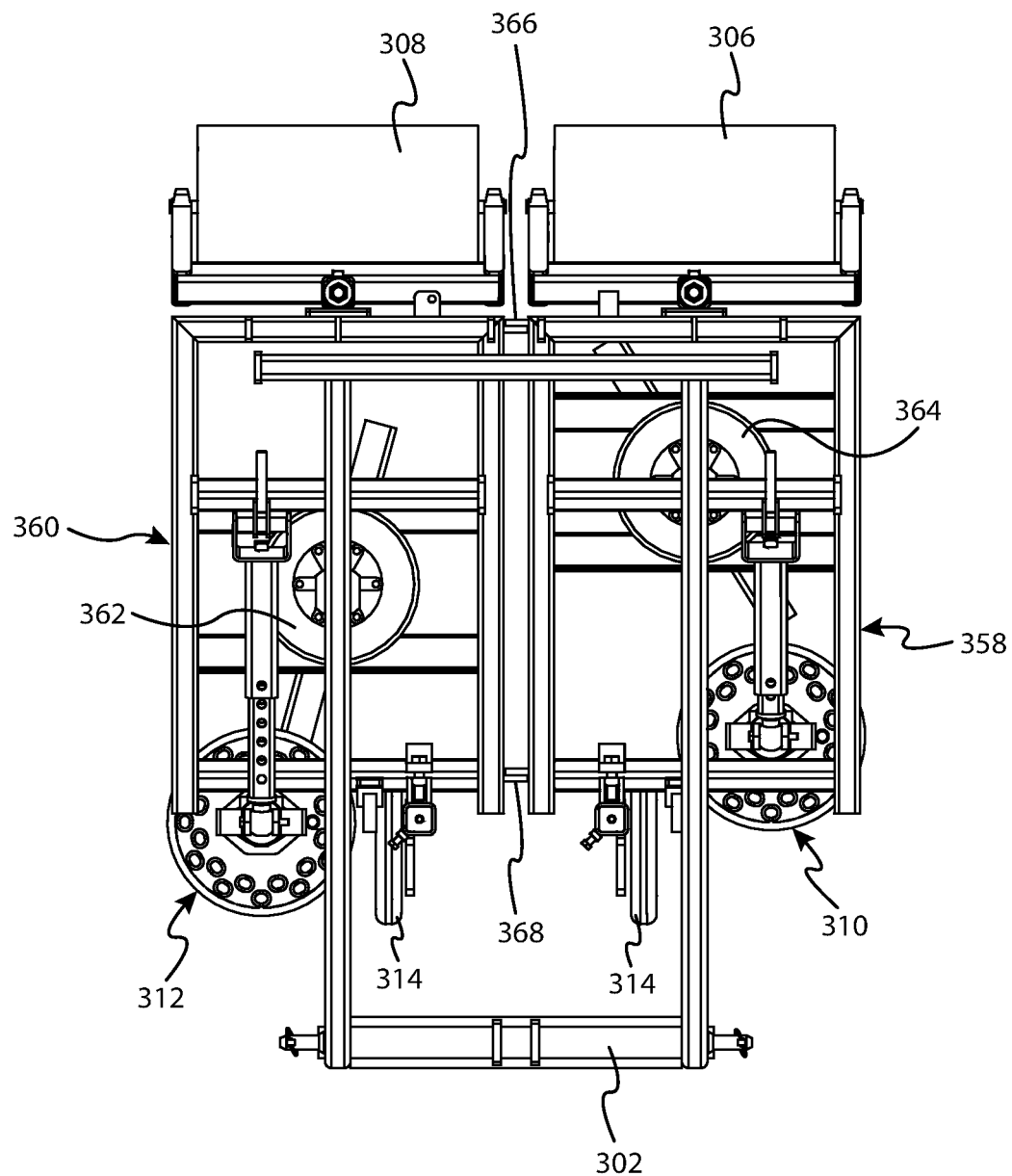
FIG. 16 is a top view of the components of a single-pass mower depicted in FIG. 11.
Figure 17:
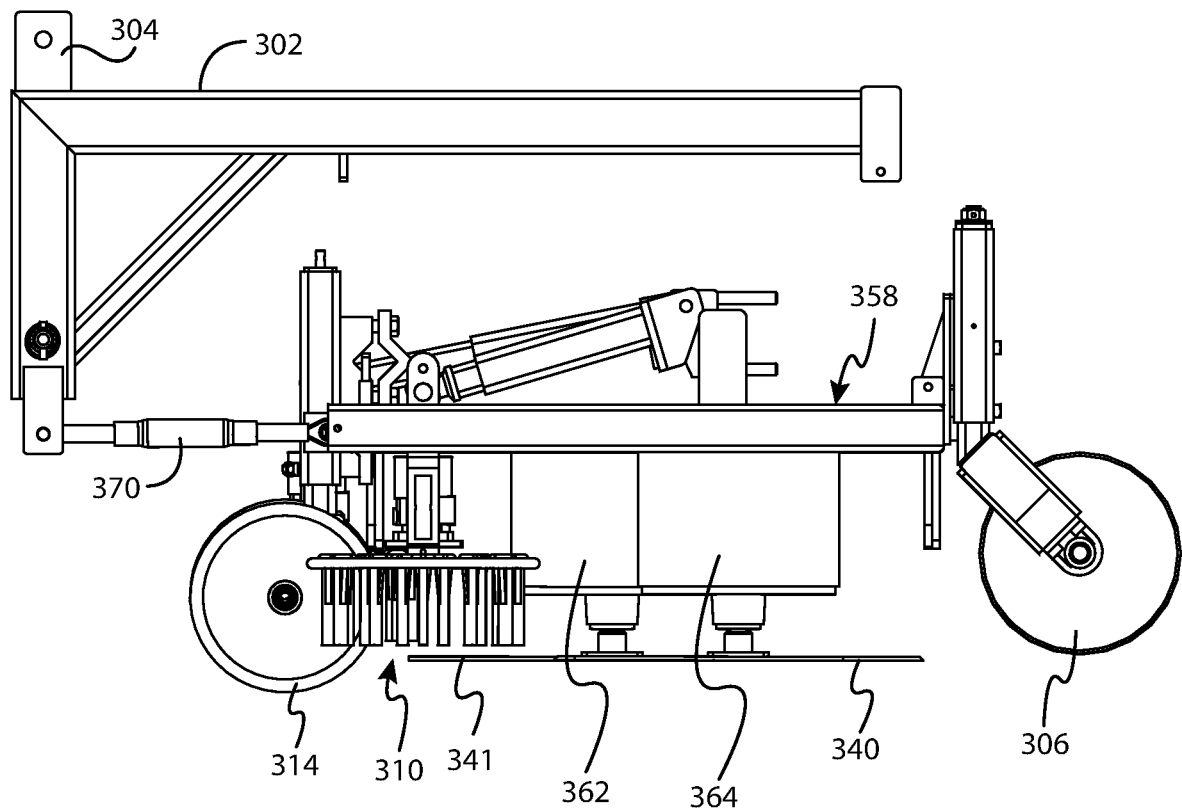
FIG. 17 is a side view of the components of a single-pass mower depicted in FIG. 11.

FIG. 16 provides a top view of single-pass mower 300, showing various components of the device as described above. FIG. 17 provides a left side view of single-pass mower, also showing various components of the device as described above. In addition, FIG. 17 shows a link 370 extending between frame 302 and subframe 358. The other side of frame 302 includes a similar link extending between frame 302 and subframe 360. These links provide a point of attachment between frame 302 and subframes 358 and 360, and also allow for side to side movement of single-pass mower 300 to promote the device following the crop bed. It is contemplated that additional attachments between frame 302 and subframes 358 and 360 may also be provided. As described above, for example, in some embodiments of single-pass mower 300 one or more chains may be affixed to an upper portion of frame 302 and attached to various points on either of subframes 358 and 360.

Figure 18:
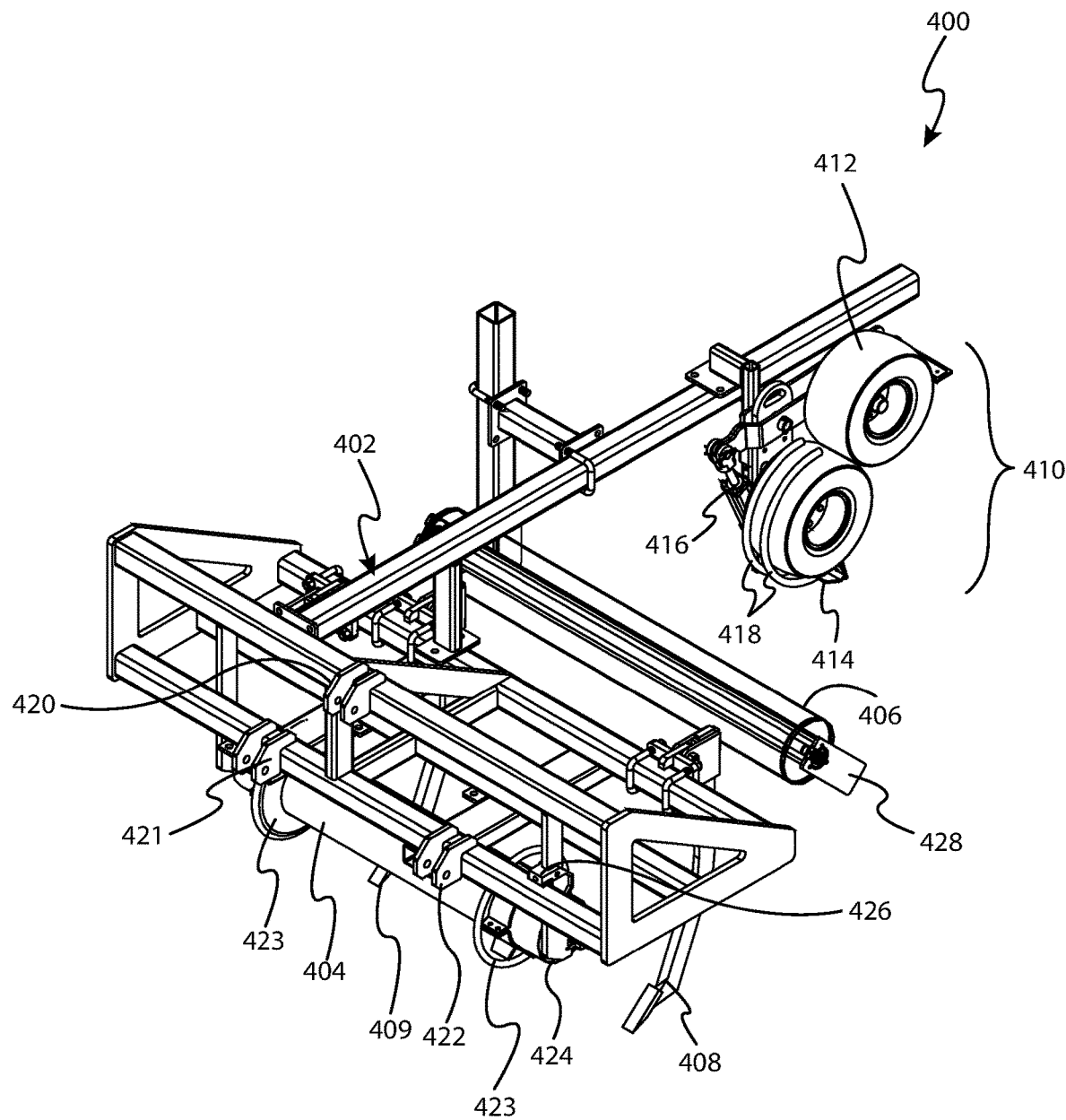
FIG. 18 is a front and side perspective view of one embodiment of extraction and lifting components of the present extractor system 400.

Once a crop bed has been mowed to remove much of the plant material therefrom and cut as low as practical without disturbing the agricultural plastics such as drip tape and plastic mulch, the agricultural plastics may be extracted. The plastic mulch on the crop bed is still held in place by the remains of the plant material that has grown up through the plastic, and may be encumbered by dirt and other debris along the sides of the crop bed. Drip tape remains beneath the plastic mulch and may be contained beneath dirt, debris, and plant material of the crop bed. Thus, it is necessary to extract the agricultural plastics from the crop bed before winding the material into an easily transportable and salable form. FIG. 18 provides a perspective view of components of one embodiment of an agricultural plastic extractor system 400 that may be used in conjunction with a crop bed.

Extractor System

Extractor system 400 includes a frame 402 on which the various other components of the device are disposed. Frame 402 includes attachments 420, 421, and 422, which serve as anchoring points for a three-point hitch for attaching extractor system 400 to a tractor or other vehicle. Alternatively, any other suitable methods or structures for attaching a device to a tractor or other vehicle may be used. While the embodiments of extractor system 400 shown in the drawings are designed to be pulled by a tractor or other vehicle, it is contemplated that some embodiments of extractor system 400 may be self-propelled. Extractor system 400 is preferably powered by a hydraulic drive (not shown). It is contemplated, however, that some embodiments of extractor system 400 may be configured to attach to a PTO shaft of a tractor or other vehicle to power the various components of extractor 402. Tires on either side of extractor system 400 allow the device to travel along the length of the crop bed and also center the device over the crop bed.

Also attached to frame 402 are a front roller 404 and rear roller 406. Front roller 404 rotates on an axle (not shown) that engages two adjustable side arms 424, one at each end of front roller 404. Each arm 424 engages slidingly with an attachment 426 of frame 402. The positions of arms 424 within attachment 426 can be adjusted and secured, for example, by a pin or other structure. Front roller 404 rides on the surface of the crop bed and maintains the height of extractor system 400 with respect to the crop bed. Flanges 423 act to center front roller 404 side to side along the crop bed. Agricultural plastics disposed in or on the crop bed pass beneath front roller 404. Rear roller 406 also rotates on an axle that engages two flanking side arms 428. In the embodiment of extractor system 400 shown in the drawings, one arm 428 is attached to frame 402, while a crossarm 430 extends along the length of rear roller 406 and parallel thereto. The second arm 428 extends from the end of crossarm 430 to engage the axle of rear roller 406. The attachment of rear roller 406 to frame 402 is made on one side of the device only, in order to provide access for feeding of agricultural plastic over rear roller 406 and into extraction head 410.

Also mounted to frame 402 are shanks 408 and 409. Shanks 408 and 409 are spaced apart at the width of the crop bed, and it is contemplated that the spacing of shanks 408 and 409 may be adjusted as necessary. Each shank 408 and 409 extends downward from frame 402 and curves in the direction of travel of extractor system 400. Shanks 408 and 409 are preferably tapered or sharpened at the lower ends thereof so that the shanks can bite into the furrows and pass through dirt and debris therein as extractor system 400 moves along the crop bed. As extractor system 400 travels along the length of the crop bed, shanks 408 and 409 run in the furrows alongside the crop bed and loosen dirt and debris around the buried agricultural plastics, but do not engage the crop bed or the agricultural plastics. The action of the shanks allows the agricultural plastics to be pulled from the bed, over the rear roller, and fed to the pinch wheels described below.

Attached to frame 402 toward the rear of extractor system 400 is extractor head assembly 410. Extractor head assembly 410 includes first pinch wheel 412 and second pinch wheel 414. First pinch wheel 412 is rotatably mounted to first wheel arm 432, while second pinch wheel 414 is mounted to second wheel arm 434, which extended perpendicularly downward from first wheel arm 432. A hydraulic cylinder 416 extends between first wheel arm 432 and second wheel arm 434, and allows a user of extractor system 400 to control the distance between first pinch wheel 412 and second pinch wheel 414. The cylinder pressure of hydraulic cylinder 416 is adjustable to set the "pinch pressure" of first and second pinch wheels 412 and 414. The tension on the agricultural plastic is adjustable, and is controlled by the torque of a hydraulic motor (not shown). When retracted, a gap between the pinch wheels allows agricultural plastics to be fed therebetween. Second pinch wheel 414 includes a pair of guides 418 that describe an arc following the curvature of the wheel and are used to guide plastic mulch, drip tape, or other plastics into the space between first pinch wheel 412 and second pinch wheel 414.

In operation, extractor system 400 is pulled along the length of a crop bed behind a tractor or other vehicle. At the start of the process, agricultural plastic is fed by hand over rear roller 406, then into the gap between first pinch wheel 412 and second pinch wheel 414. The rotating pinch wheels grab the agricultural plastic and feed the plastic therebetween. As extractor system 400 continues to travel along the crop bed, shanks 408 and 409 dig into the furrow, exposing buried plastic and allowing the pinch wheels to pull agricultural plastics from the crop bed. As the agricultural plastics travel over rear roller 406, much of the dirt and debris that has accumulated on the plastics in the crop bed is removed. The relatively clean agricultural plastics are pulled through first and second pinch wheels 412 and 414, which form the agricultural plastics into a rope-like mass of material that is deposited back onto the crop bed behind extractor system 400 in a relatively straight and uniform manner. The presence of rear roller 406 also allows for faster extraction of plastic mulch and drip tape at the start of an extraction operation, without breaking or tearing the plastic.

As noted above, the tension on the agricultural plastics being pulled through first pinch wheel 412 and second pinch wheel 414 can be adjusted via hydraulic motor torque. It is preferred that the speed of rotation of first and second pinch wheels 412 and 414 is adjusted automatically to match the over-the-ground speed of extractor system 400 as it moves along the crop bed. Thus, the pinch wheels pull the agricultural plastics through at the same rate at which extractor system 400 is extracting them from the crop bed. It is contemplated, however, that in some embodiments of extractor system 400, the speed of rotation of first and second pinch wheels 412 and 424 may be adjusted independently of the speed of travel of extractor system 400.

Figure 19:
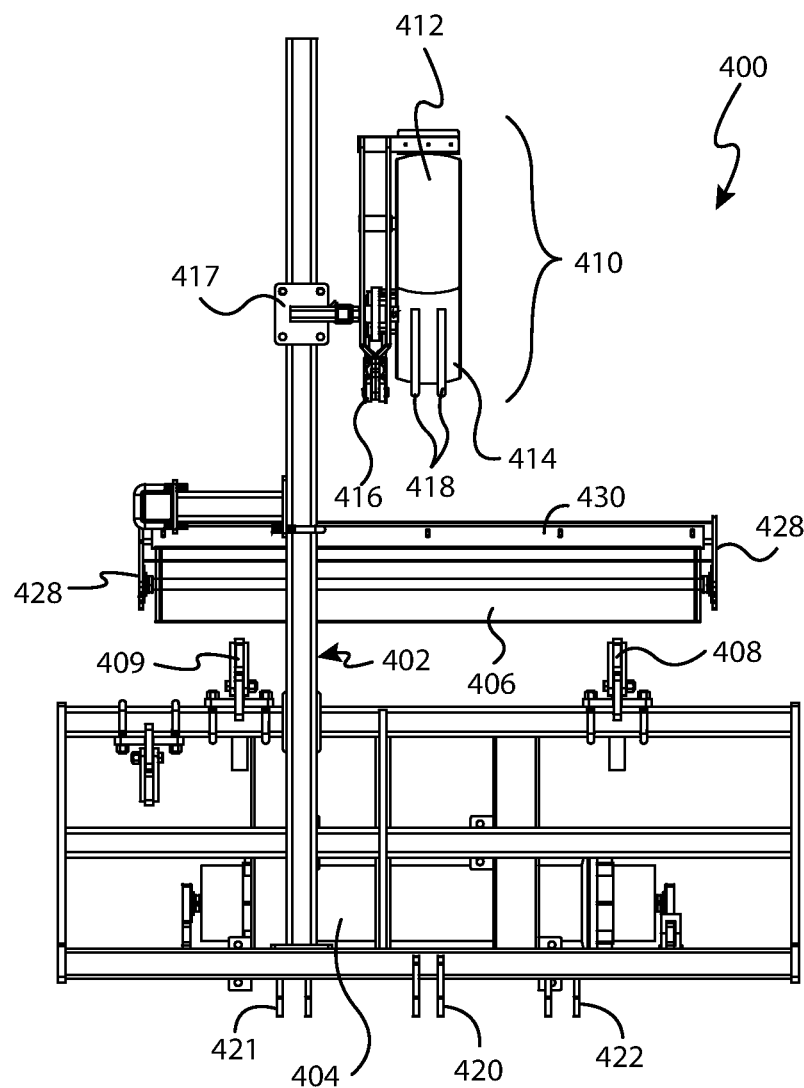
FIG. 19 is a top view of the extractor system 400 of FIG. 18.

FIG. 19 is a top view of extractor system 400, depicting various components of the device described above. The spacing of shanks 408 and 409 can be more clearly seen, and as noted above the spacing of the shanks can be adjusted according to the width of the crop bed so that shanks 408 and 409 travel just outside the edges of the crop bed. Also shown in FIG. 19 is attachment 417, which attaches extractor head assembly 410 to frame 402. In some embodiments of extractor system 400, extractor head assembly 410 may be fixedly attached to frame 402 at a predetermined distance from rear roller 406. It is contemplated, however, that attachment 417 may allow for the extractor head assembly 410 to be adjustably positioned along the length of a portion of frame 402, such that extractor head assembly 400 may be moved closer to, or farther from, rear roller 406, as desired.

Figure 20:
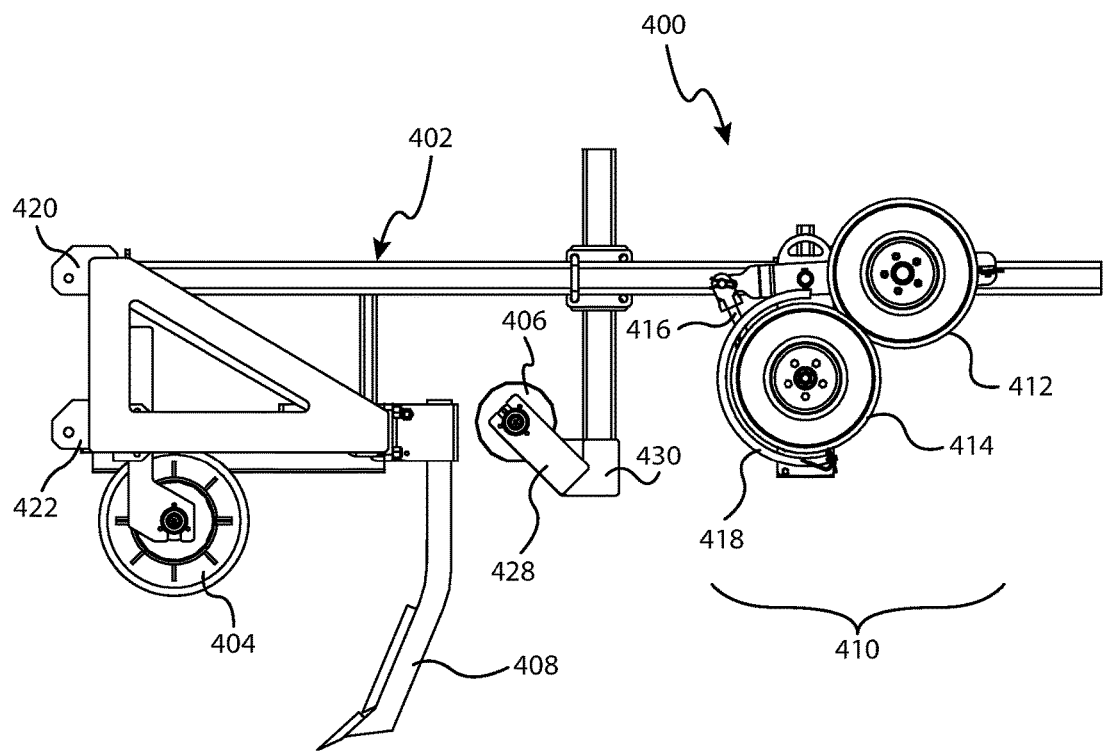
FIG. 20 is a side view of the extractor system 400 of FIG. 18.
Figure 21:
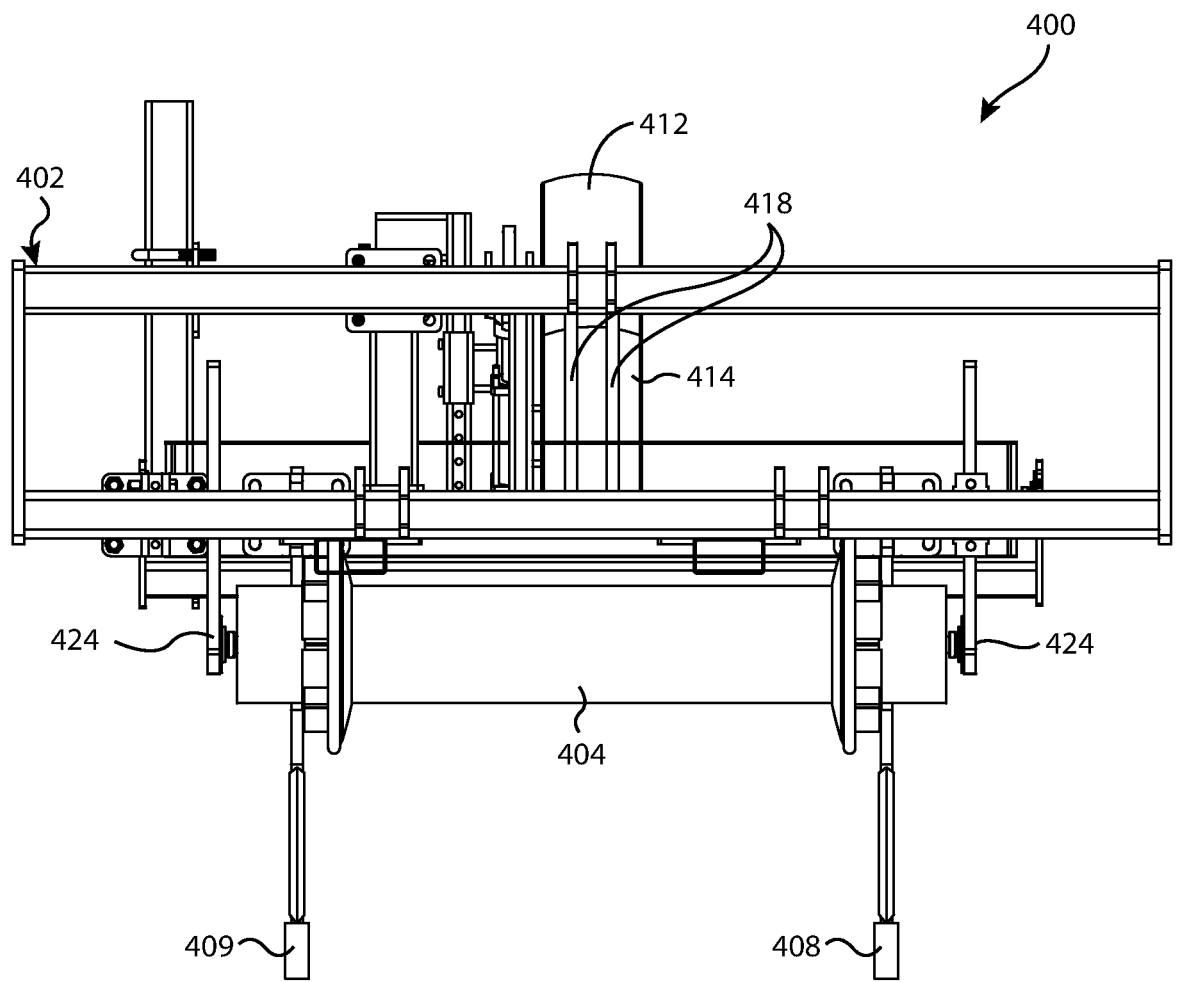
FIG. 21 is a front view of the extractor system 400 of FIG. 18.

FIG. 20 provides a left side view of extractor system 400, depicting various components of the device as described above. FIG. 21 provides a front view of extractor system 400, also with previously-described components of the device depicted.

Figure 22:
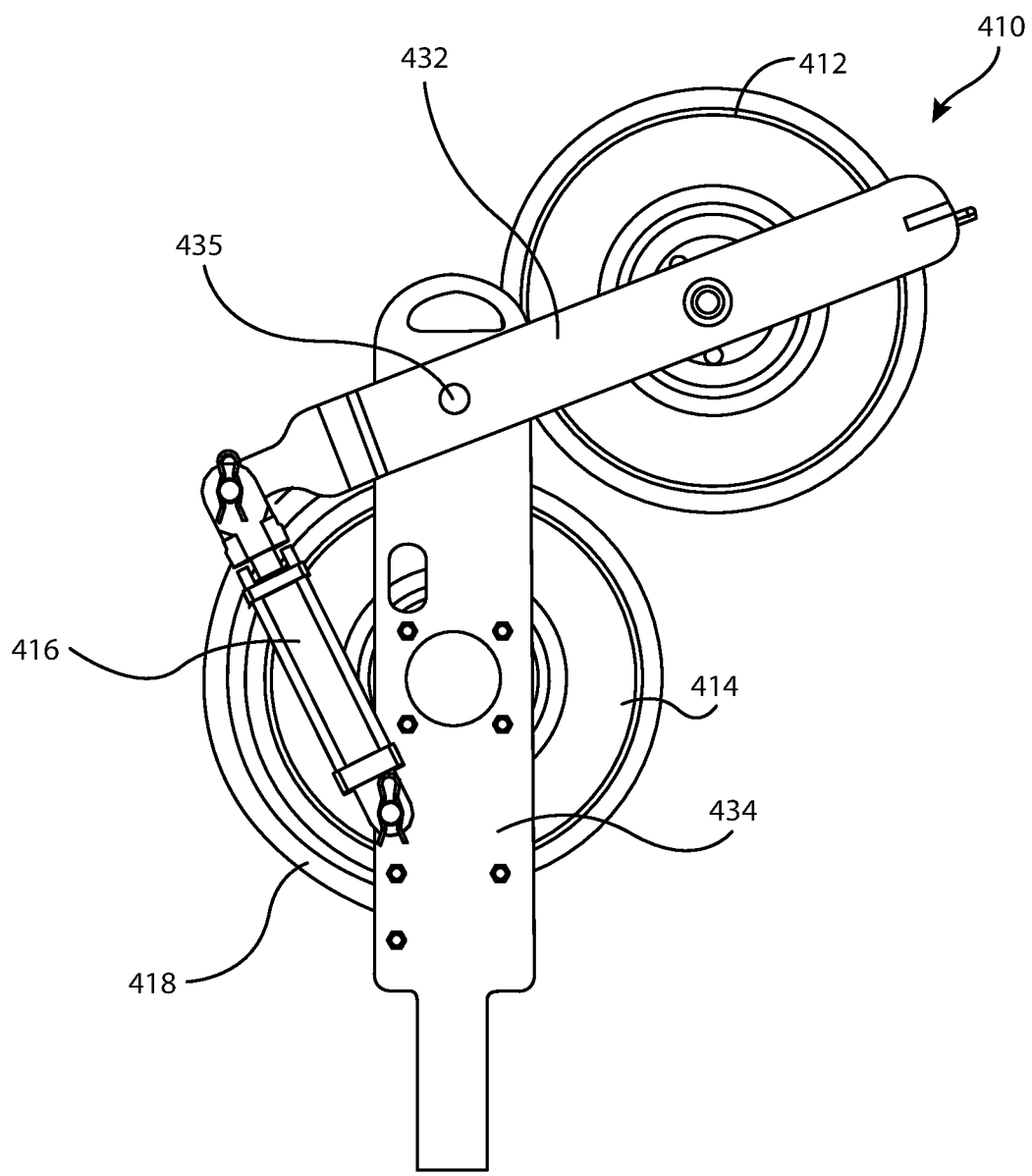
FIG. 22 is a side view of components of one embodiment of an extractor head assembly suitable for use with the extractor system 400 of FIG. 18.

FIG. 22 is a side view of a portion of extractor head assembly 410, specifically first pinch wheel 412, second pinch wheel 414, and the structural relationship therebetween. The figures depict the structure that allows the distance between the pinch wheels to be adjusted. As shown in the figure, a hydraulic cylinder extends between first wheel arm 432 and second wheel arm 434, to which first pinch wheel 412 and second pinch wheel 414 are mounted, respectively. First wheel arm 423 and second wheel arm 434 are pivotally attached at pivot 435. As can be seen from the figure, linear motion of hydraulic cylinder 416 causes first wheel arm 423 to move about pivot 435, thereby adjusting the distance between first pinch wheel 412 and second pinch wheel 414. In the embodiment of extractor head assembly 410 depicted in the figures, second pinch wheel 414 is the driving wheel, and first pinch wheel 412 is the driven wheel.

Although the embodiment of extractor system 400 shown in the figures moves along one crop bed at a time, it is contemplated that multiple extractors 400 may be attached in parallel to move across multiple crop beds at once, or that a single, larger extractor system 400 may be constructed utilizing the same principles set forth above, but extending across two, three, or more crop beds in order to extract agricultural plastics from multiple crop beds simultaneously.

Though not shown in the figures, it is contemplated that an extractor may be provided with two extractor head assemblies instead of the single extractor head assembly of extractor system 400. In embodiments using two extractor head assemblies, plastic mulch and drip tape may be extracted separately and formed into separate rope-like structures that can later be wound onto separate reels by a winding device of the present system. This dual extraction-head arrangement may be desirable because drip tape and plastic mulch have different recycling values.

One embodiment of an extractor using multiple extractor head assemblies to separate plastic mulch from drip tape may include a primary extractor head assembly such as that shown associated with extractor system 400, and may include a pair of additional extractor head assemblies downstream of the primary extractor head assemblies. These additional extractor head assemblies may, for example, be of the type depicted in FIGS. 36 through 38 and described below, or may be any other suitable extractor head assembly constructed in accordance with the present disclosure. The additional extractor head assemblies may be smaller and more compact than the primary extractor head assembly. As the combined agricultural plastics are extracted from the crop bed and pass through the primary extractor head assembly, the materials may be separated into plastic mulch and drip tape, with each material feeding into one of two separate additional extractor head assemblies. The separated drip tape material is preferably deposited back onto the crop bed, while the separated plastic mulch is preferably deposited into a furrow running along the crop bed to prevent wind from picking up the plastic mulch and carrying it away from the work site. The extractor head assembly that is to be fed the plastic mulch may rotate around a vertical pin to ensure that the plastic mulch is deposited in the furrow along the crop bed rather than on top of the crop bed. Once the agricultural plastics have been separated and deposited into the furrow or onto the crop bed, as appropriate, the material may be wound onto separate reels by winding device 500, described below.

Winding Device

After extractor system 400 has been utilized to pull the agricultural plastics from the crop bed, the agricultural plastics will be disposed along the surface of the crop bed in a rope-like structure. Winding device 500 travels perpendicular to the crop beds and winds the agricultural plastics into readily transportable, salable bundles.

Figure 23:
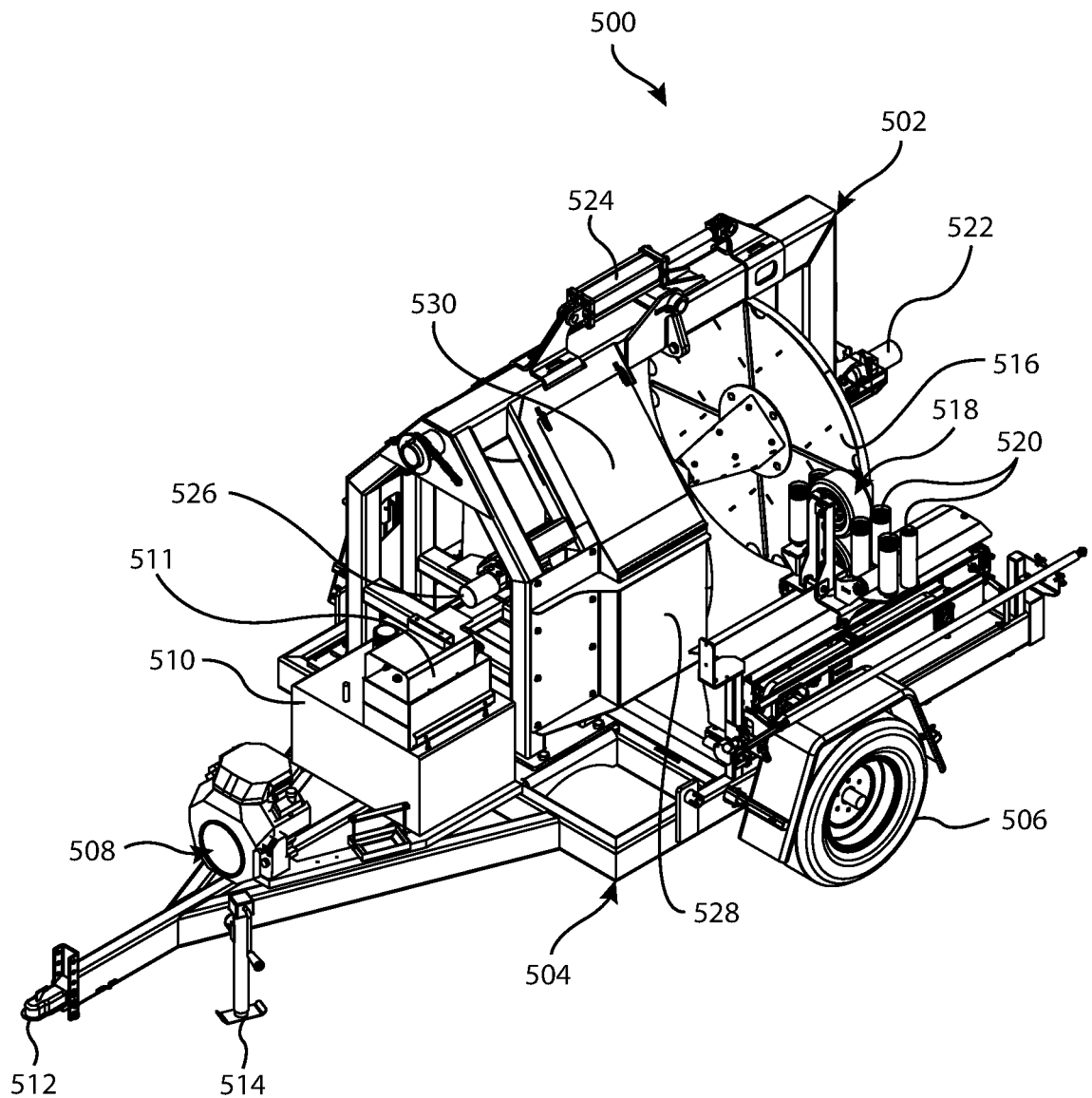
FIG. 23 is a front and side perspective view of one embodiment of a winding device of the present system.

FIG. 23 provides a front and side perspective view of one embodiment of a winding device 500 for use with the present system. The various components of winding device 500 are preferably mounted to a trailer 504, along with a motor 508 to power the components of winding device 500, a fuel tank 511, and a hydraulic fluid reservoir 510. Although the embodiment of winding device 500 shown in the figures includes a motor and fuel supply, it is contemplated that other embodiments of winding device 500 may be adapted to engage a PTO shaft of a tractor or other vehicle, or to engage the hydraulic system of a tractor or other vehicle, thereby providing power to the device, or may be adapted to be powered by the hydraulic system another vehicle. Still other embodiments of winding device 500 may be self-propelled.

Winding device 500 includes a tower frame 502 to which various components of the device are attached. Tower frame 502 of winding device 500 has defines an interior space generally shaped as an inverted "U" in which the reels of the device (described below) are contained. A housing 528 enclosing a portion of tower frame 502 includes other components of the device, as described below. Trailer 504 may be any conventional trailer on which winding device 500 can be installed, or may be built specifically for use with winding device 500. Trailer 504 includes a tongue 512 for attachment to the hitch of a pickup truck or other vehicle, a jack 514, and wheels 506.

Figure 24:
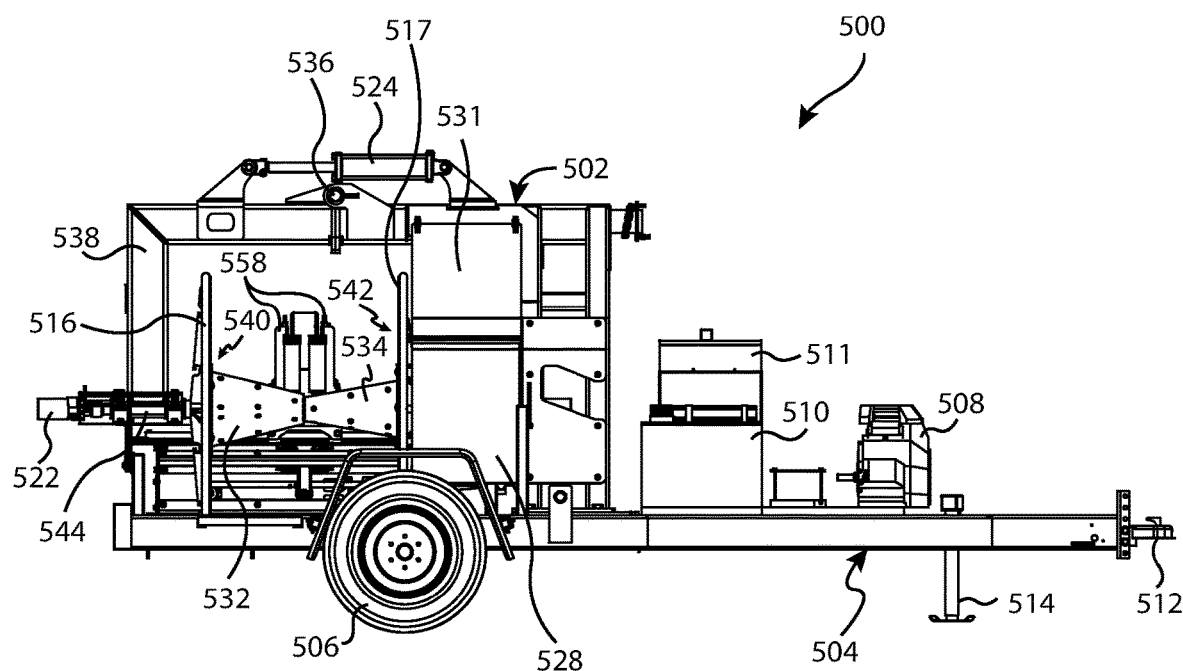
FIG. 24 is a right side view of the winding device of FIG. 23.

FIG. 24 provides a right side view of the embodiment of winding device 500 shown in FIG. 23. Various components of winding device 500 described above are visible, including trailer 504 and its associated components, tower frame 502, motor 508, fuel tank 511, and hydraulic fluid reservoir 510. Additional structure of winding device 500 is more readily visible in FIG. 24, including details of tower frame 502 and the disposition of reels 540 and 542 therein. As shown in the figure, reel 540 includes a side plate 516 and a truncated pyramid-shaped spool 532. Reel 542 includes a side plate 517 and a truncated, pyramid-shaped spool 534. The truncated ends of spools 532 and 534 preferably have little clearance between them when reels 540 and 542 are in the closed position, though some small distance is desired as reels 540 and 542 operate independently. Reel 540 rotates via a shaft 544 driven by hydraulic motor 522. Reel 542 rotates via a shaft 546 driven by hydraulic motor 526. Although hydraulic motors 522 and 526 independently rotate reels 540 and 542, respectively, it is preferred that the hydraulic motors which drive each reel are connected together hydraulically in series circuit so that both reels rotate at the same speed. It is also it is contemplated that other embodiments of the hydraulic motor circuit could include plumbing these motors in parallel, which would allow increased motor torque for pulling longer lengths of drip tape and mulch, as well as other film products.

FIG. 24 also provides additional detail regarding tower frame 502. For example, L-shaped arm 538 of tower frame 502 is capable of pivoting about pivot 536, thereby moving reel 540 away from reel 534 and lifting reel 540 upward. This pivoting motion is actuated by hydraulic ram 524, which spans arm 538 and the remainder of tower frame 502. Reel 540 is moved away from reel 542 after the agricultural plastic has been successfully wound onto the reel, as described further below.

Figure 25:
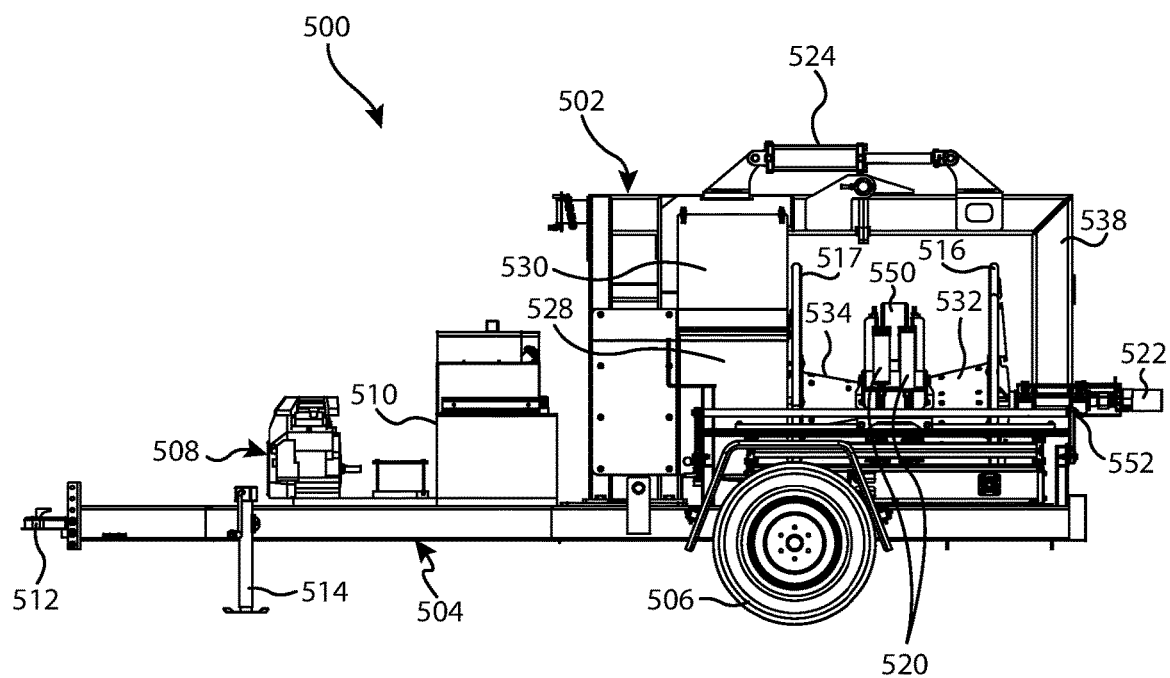
FIG. 25 is a left side view of a winding device of FIG. 23.

FIG. 25 is a left side view of winding device 500, providing a view of many of the components of the device described above. In addition to the above-described components, a first pinch wheel 550 and a first set of guides 520 are more clearly shown in the figure. Agricultural plastics pass through guides 520 and between first pinch wheel 550 and second pinch wheel 554 prior to being wound around reels 540 and 542. Details regarding the winding action of winding device 500 are described below. Also shown in FIG. 25 is safety stop 552, which disengages reels 540 and 542 when depressed. The combination of guides and pinch wheels forms a guide assembly 518 that travels laterally and through which agricultural plastics pass prior to reaching the reels.

Figure 26:
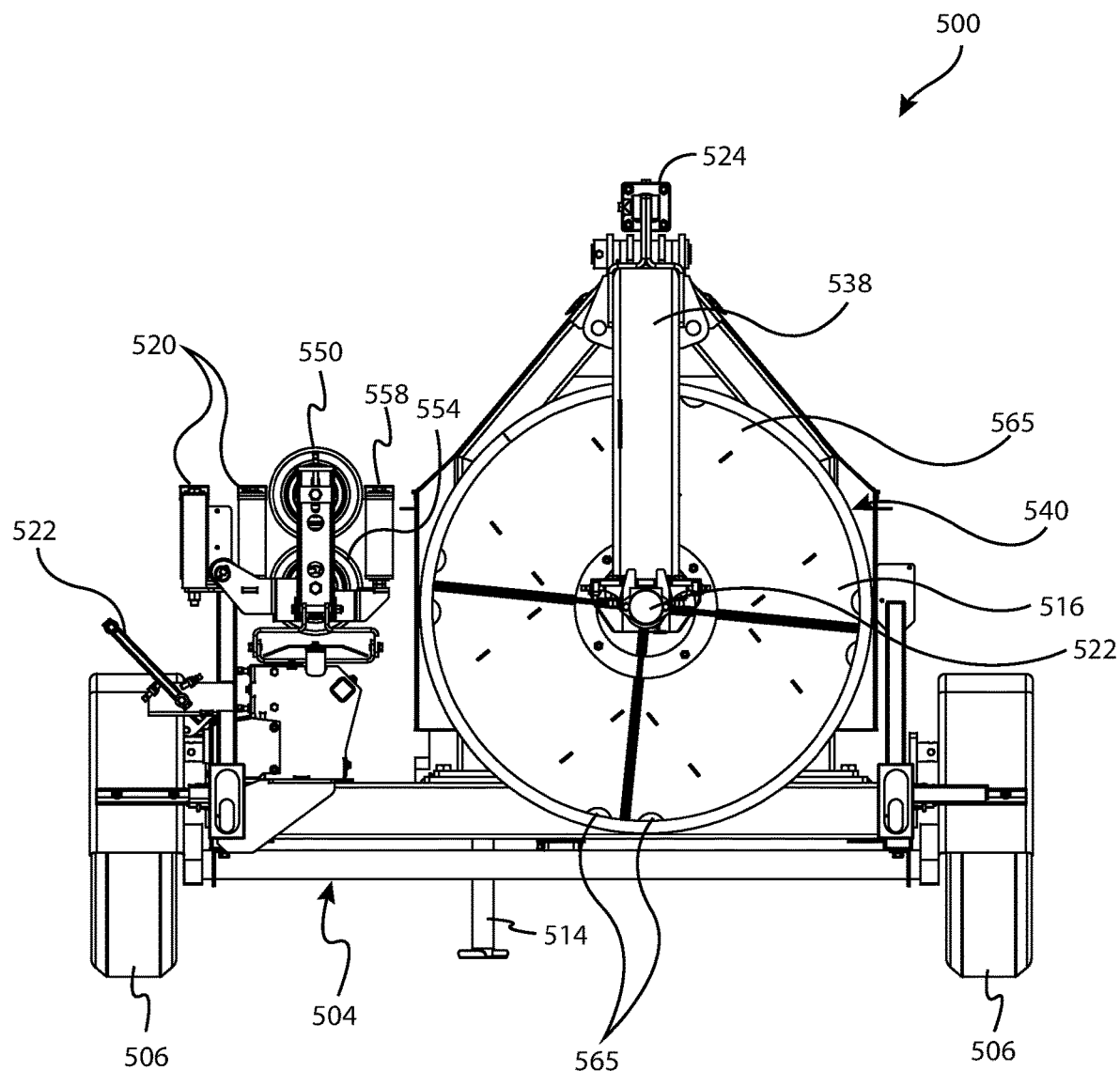
FIG. 26 is a rear view of a winding device of FIG. 23.

FIG. 26 is a rear view of winding device 500, showing additional views of the many of the components thereof previously described. The figure provides a clear view of first pinch wheel 550 and second pinch wheel 554. Guides 520 are shown, as well as a second set of guides 558. Agricultural plastics pass through guides 520, between pinch wheels 550 and 554, and then through guides 558 before being directed onto reels 540 and 542. Also shown in FIG. 26 is safety stop 552.

In use, the embodiment of winding device 500 shown in the figures is positioned perpendicular to a crop bed on which extractor system 400 has already been utilized. The agricultural plastics to be bound will, at this point, have been disposed along the top of the crop bed as a roughly rope-like mass of material. An end of the plastic, rope-like material is fed through guides 520, between first and second pinch wheels 550 and 554, and through guides 558. The end of the plastic material is then secured between spools 532 and 534. Spools 532 and 534 may be separated, using hydraulic ram 524, to an extent sufficient to allow the plastic material to be positioned between the truncated tips of the spools, whereupon the reels are once again brought together to clamp the plastic material therebetween. Alternatively, a worker may manually force the ends of the plastic material between the truncated tips of spools 532 and 534 while reels 540 and 542 are in the closed position.

Once the plastic material is firmly held between reels 540 and 542, winding device 500 is powered and reels 540 and 542 rotate. The pinch wheels rotate due to the passing of the agricultural plastics therethrough, but are not independently powered in the embodiment of winding device 500 shown. Alternate embodiments of winding device 500 may provide for independent powering of pinch wheels 550 and 554 such that they are actively rotated. As the reels rotate, the ropy agricultural plastics are dragged along the crop bed and through the first set of guides 520 as they are being fed into the device. The plastic material passes through pinch wheels 550 and 554 and a second set of guides 558. The agricultural plastics are then wound tightly around the reels. During the winding process, guide assembly 518 moves laterally, back and forth along the width of spools 532 and 534, thereby ensuring that the agricultural plastics are wound about the spools in a uniform manner. As the end of the materials on a given crop bed nears winding device 500, the winding device may be pulled forward and positioned perpendicular to an adjacent crop bed. The agricultural plastics disposed on the adjacent crop bed may be wrapped around the plastic material already being wound, at which point the new length of agricultural plastic is incorporated into the existing roll of wound material.

Figure 27:
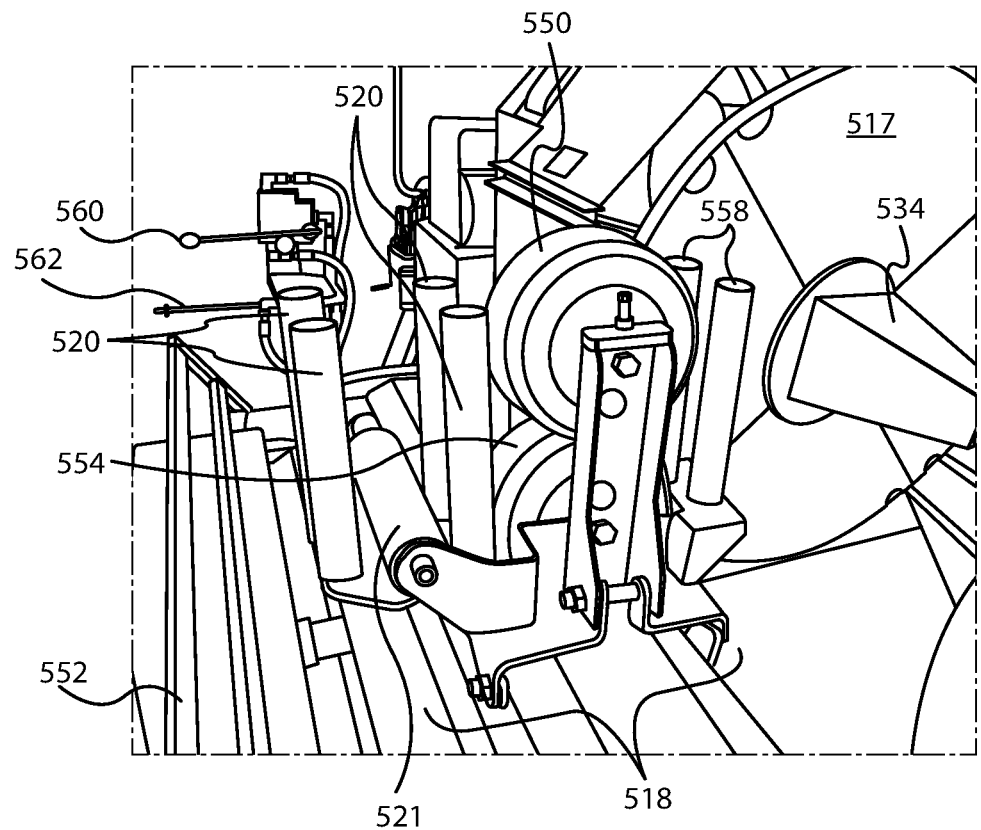
FIG. 27 is a close perspective view of a guide assembly and other components of a winding device of FIG. 23.

During the winding process, it may be necessary or desirable to control the rotational speed of reels 540 and 542, or the speed of the lateral movement of guide assembly 518. FIG. 27 provides a close view of guide assembly 518, and also depicts control levers 560 and 562. In the embodiment of winding device 500 shown in the figures, control lever 560 is utilized to regulate the rotational speed of reels 540 and 542, while control lever 562 is utilized to regulate the speed of lateral movement of guide assembly 518.

Figure 28:
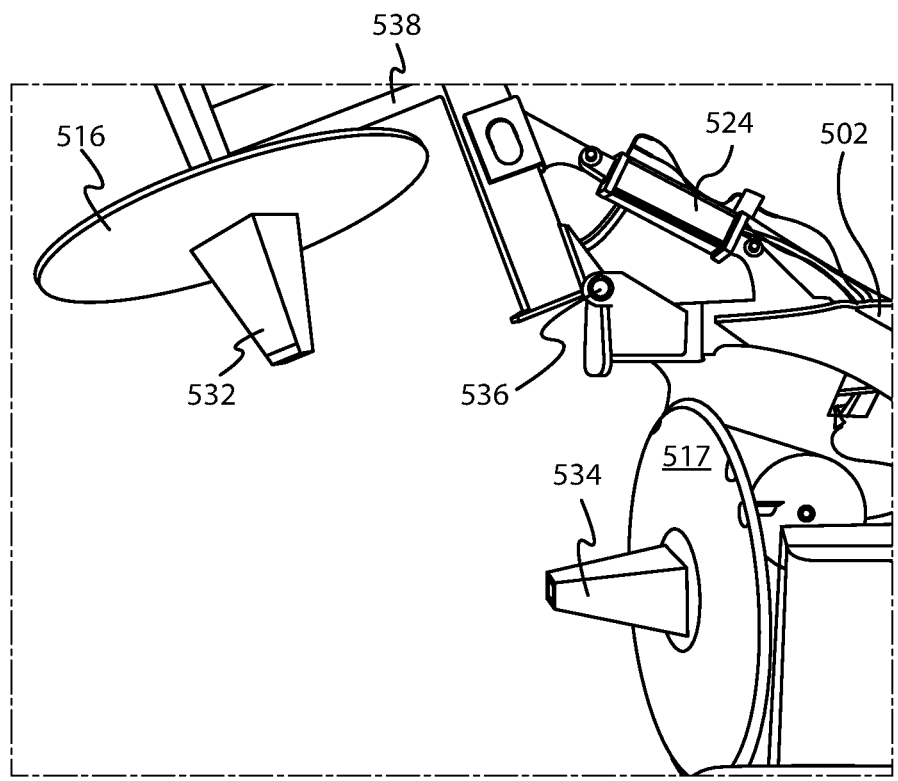
FIG. 28 is a side view of a portion of the winding device of FIG. 23, showing the reels thereof in a separated position.

Once reels 540 and 542 contain a complete roll of wound agricultural plastic, the roll of plastic must be removed from the winding device 500 for transport and recycling. FIG. 28 depicts reel 540 of winding device 500 in an open position. As shown, arm 538 rotates around pivot 536 through the action of hydraulic ram 524. The pivoting action is such that reel 540 rotates almost ninety degrees. The wound agricultural plastic slides from both tapered spools 532 and 534 when reel 540 and associated spool 532 are retracted from the wound material.

Figure 29:
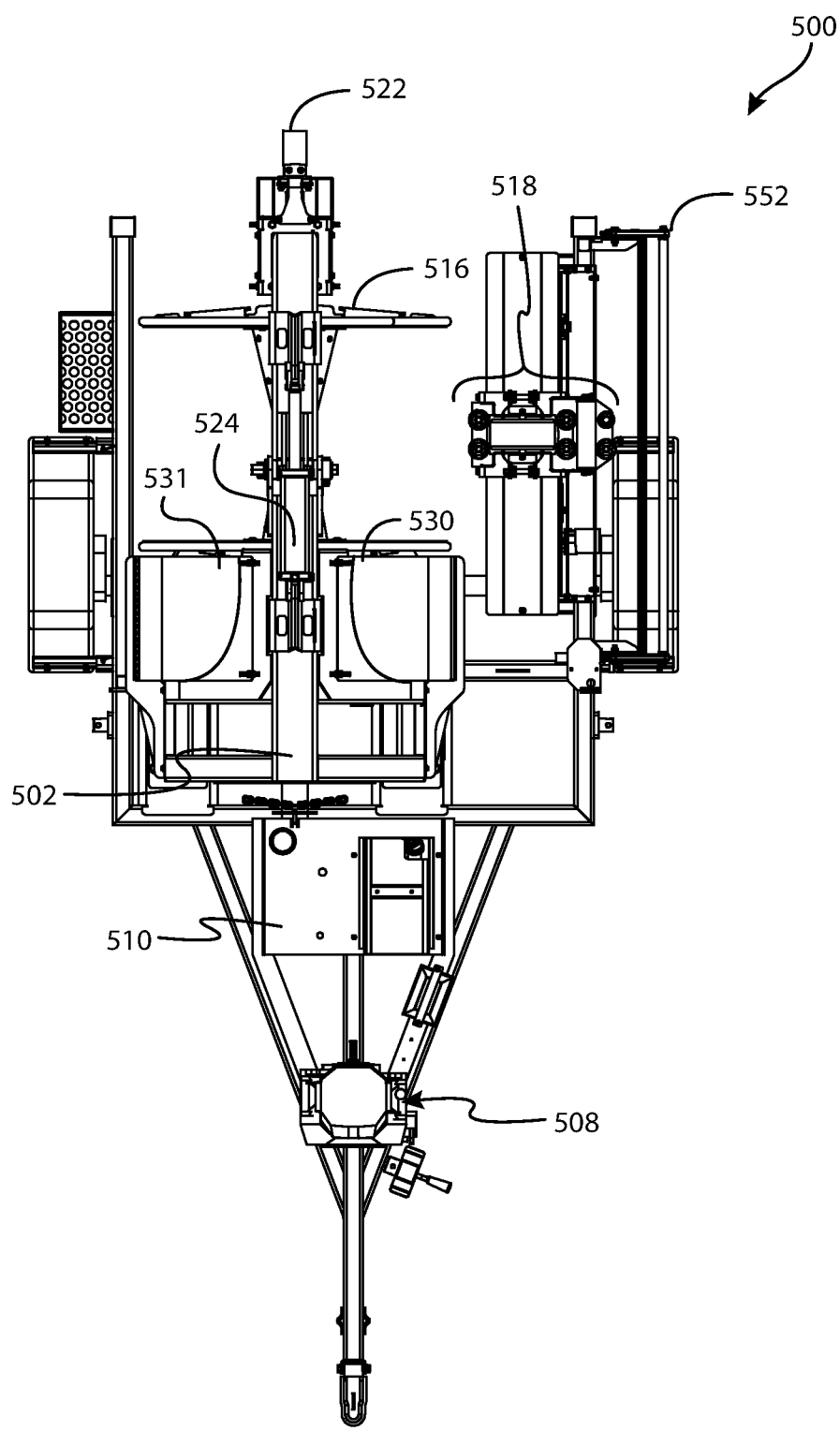
FIG. 29 is a top view of a winding device of FIG. 23.
Figure 30:
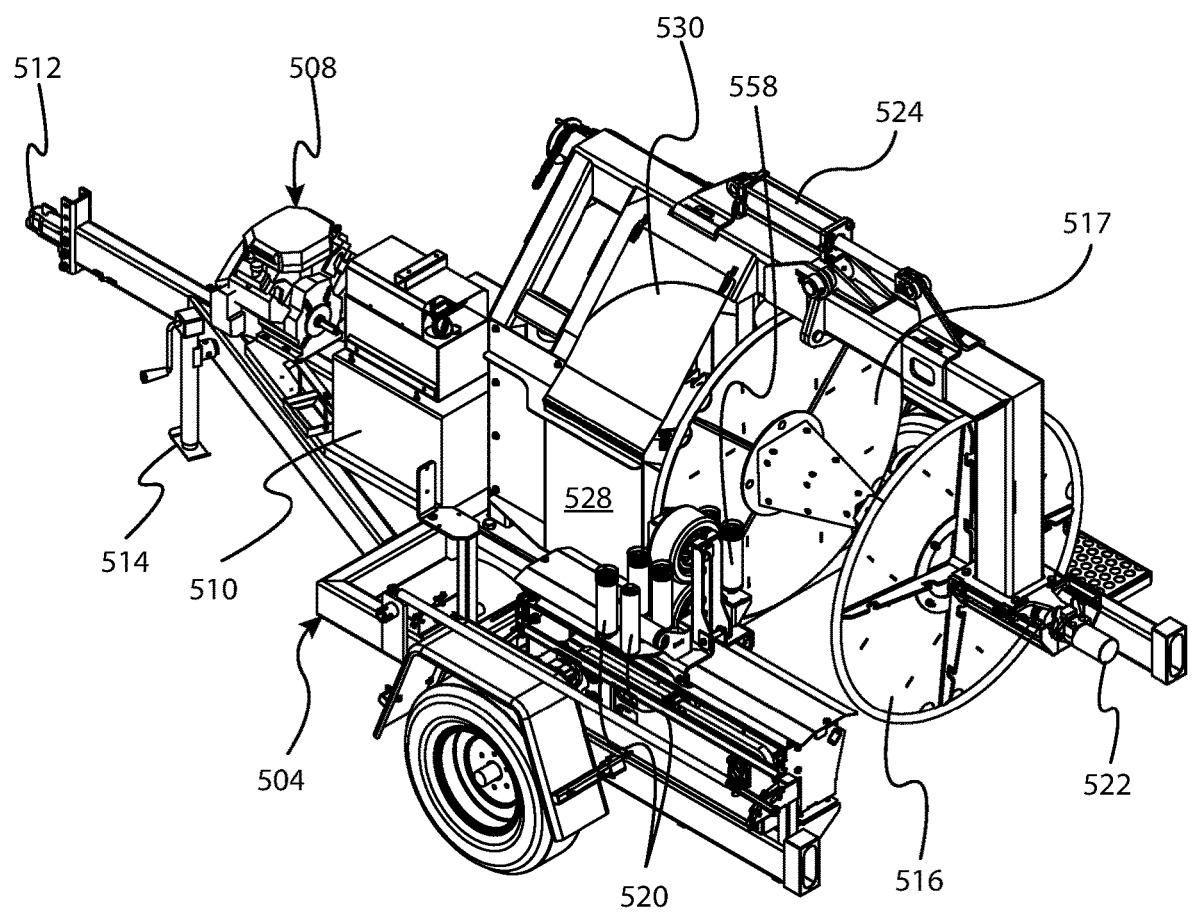
FIG. 30 is a rear and side perspective view of a winding device of FIG. 23.
Figure 31:
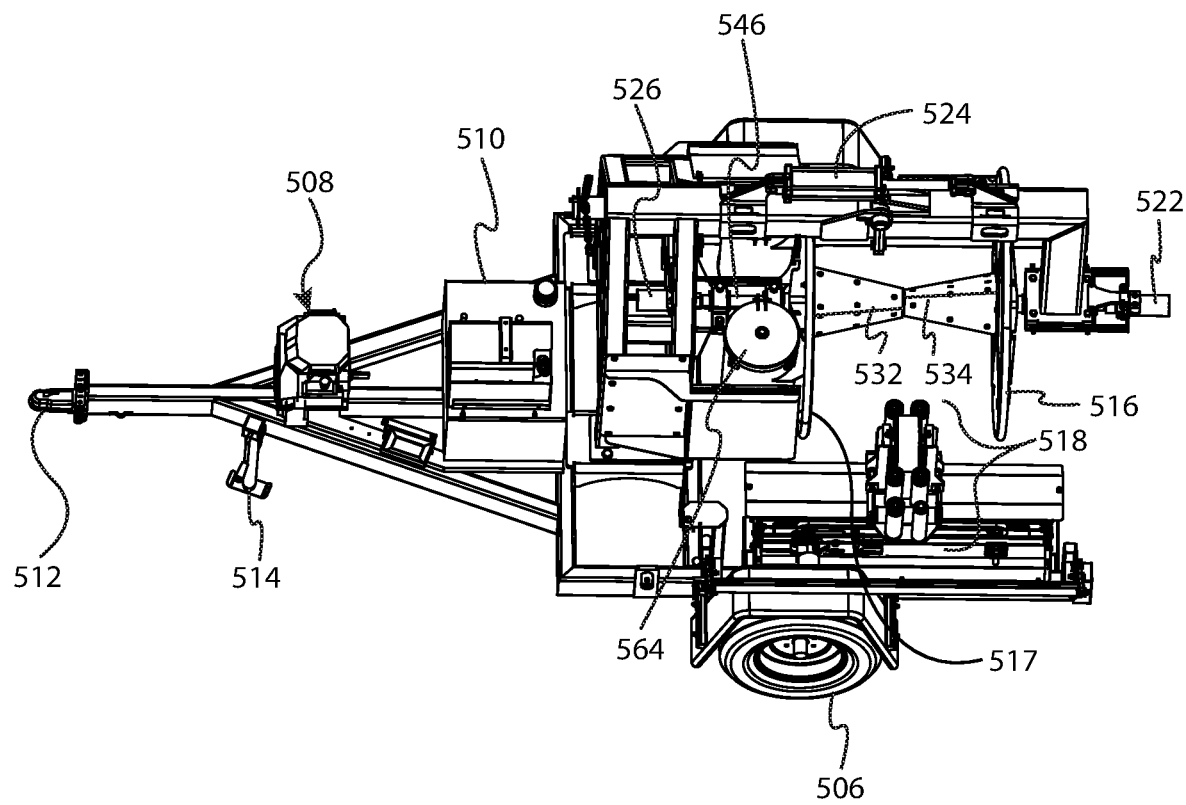
FIG. 31 is a top and side perspective view of a winding device of FIG. 23 with certain interior components thereof exposed.

FIG. 29 provides a top view of winding device 500, with various components of the device depicted as described above. FIG. 30 provides a rear and side perspective view of winding device 500 that also depicts various components described above. FIG. 31 provides a left side perspective view of winding device 500 with housing 528 and access panel 530 removed. With these structures removed, hydraulic motor 526, and the shaft 546 that drives rotational movement of reel 542, are visible.

Figure 32:
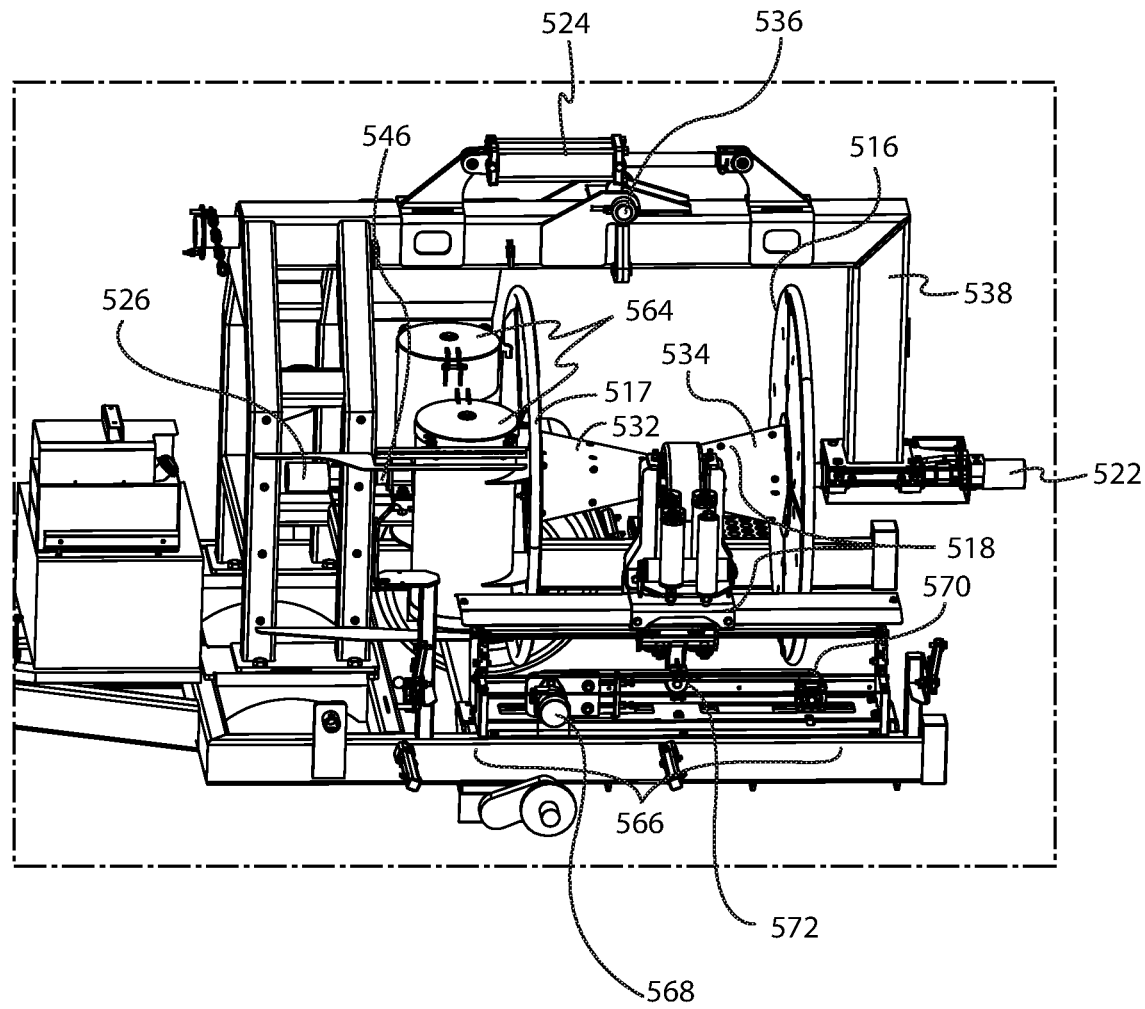
FIG. 32 is a close side perspective view of a winding device of FIG. 23 with certain interior components thereof exposed.
Figure 33:
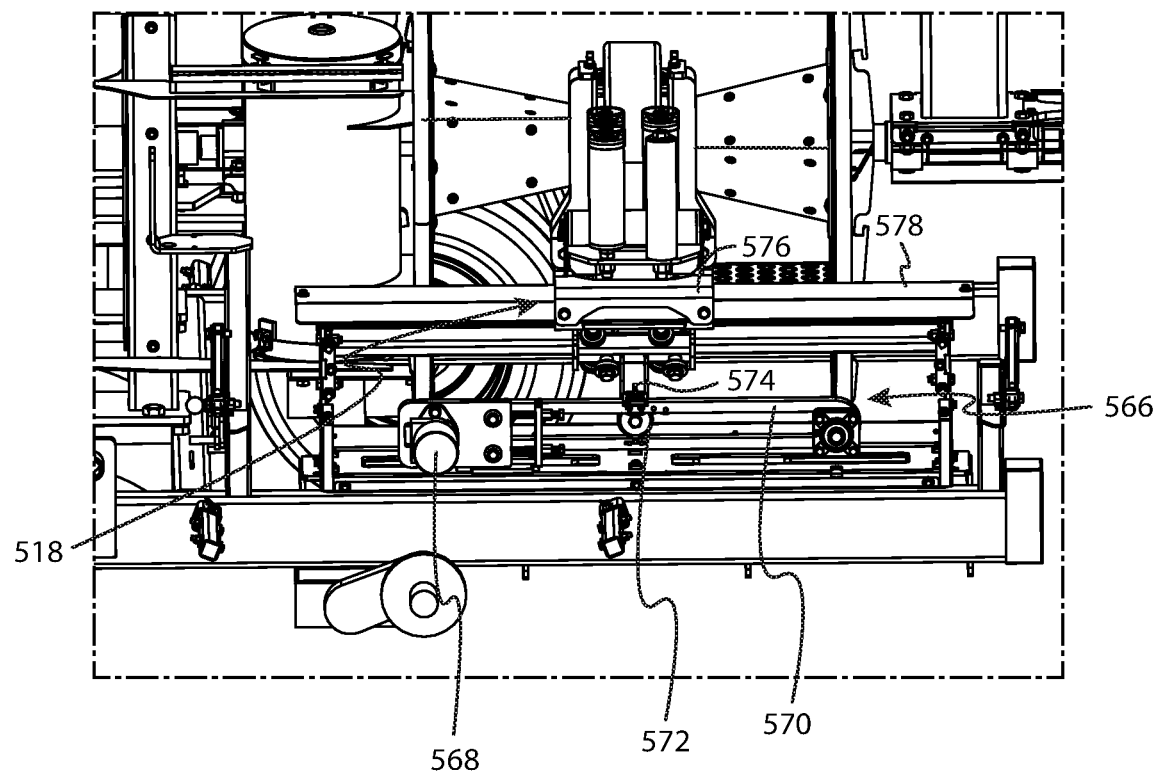
FIG. 33 is a close perspective view of the guide assembly and chain loop assembly of the winding device of FIG. 23.
Figure 34:
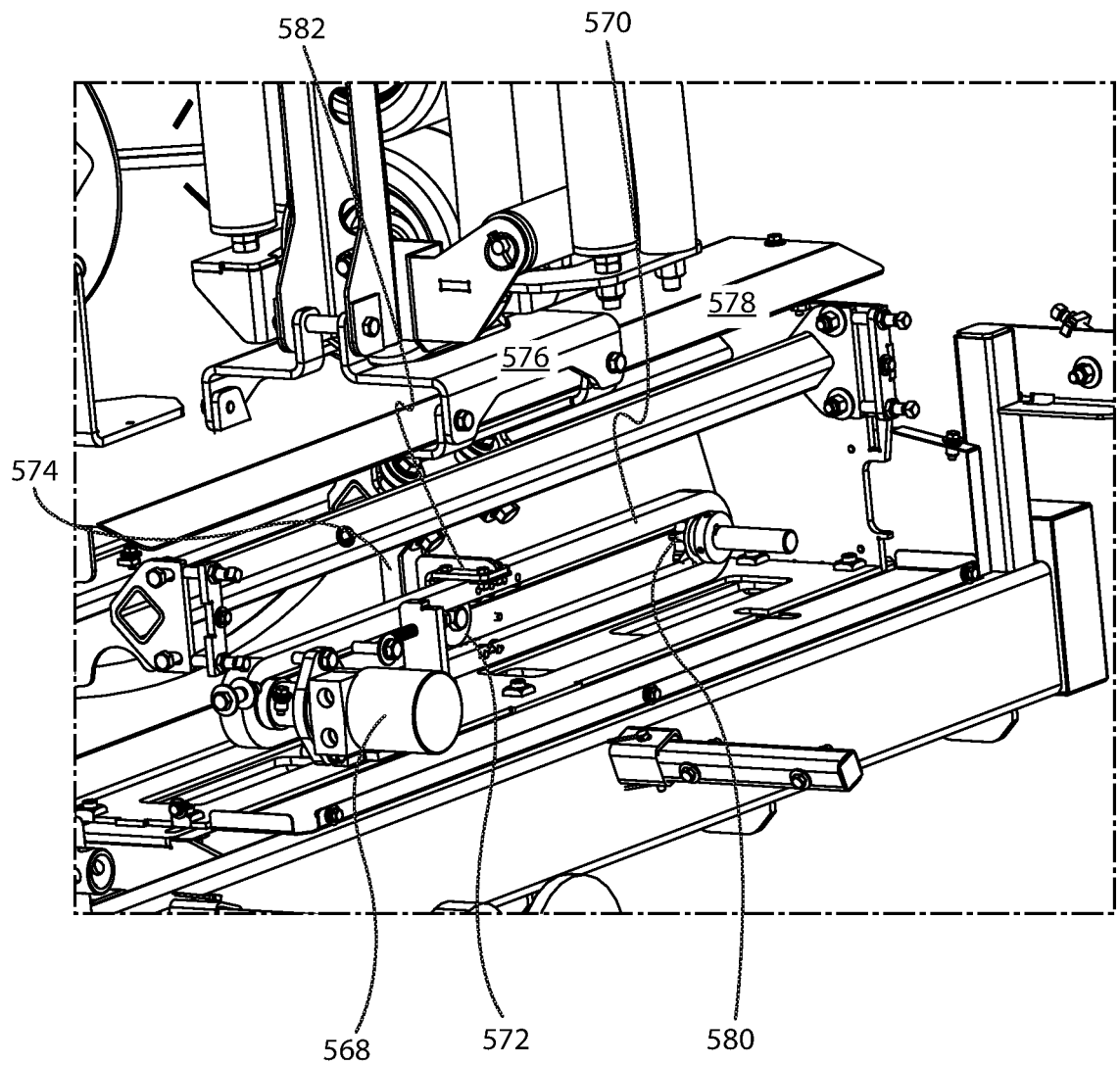
FIG. 34 is a close perspective view of the chain loop assembly of a winding device of FIG. 23.

FIG. 32 provides a close view of various components of winding device 500, including components within housing 528. In addition, chain loop assembly 566 is shown. Chain loop assembly 566 drives the lateral movement of guide assembly 518. FIG. 33 provides a close view of chain loop assembly 566, which includes chain loop 570, flat washer 572, arm 574, and hydraulic motor 568. FIG. 34 is a perspective view of chain loop assembly 566, shown from an angle. Attachment 582, which affixes the guide assembly 518 to chain loop 570, is clearly visible, as is first sprocket 580. A second sprocket is provided at the end of chain loop 570 adjacent hydraulic motor 568, and it is the second sprocket that drives the looping motion of chain loop 570. Guide assembly 518 rides on a supporting structure 576 that includes a plurality of supporting plates. The supporting plates are preferably constructed such that there is an opening formed therebetween, so that guide assembly 518 can travel back and forth along the length of shield 578. Shield 578 prevents dirt and other debris from falling into chain loop assembly 566 and interfering with the operation thereof. Also shown in FIG. 32 are twine canisters 564, which are contained within housing 528. Twine canisters 564 dispense twine to be used in tying off rolls of agricultural plastic bound by winding device 500. Although reference is made to "twine," it is contemplated that any suitable material for tying off the rolls of agricultural plastic may be utilized, and such material may be contained within canisters or other structures associated with winding device 500. Such materials, including but not limited to twine, may be referred to herein as a "cord" or as "cords." In an exemplary method of tying off rolls of wound agricultural plastics created by winding device 500, four strands of twine may be used, the strands passing through cutouts 565 (best seen in FIG. 26) of side plates 516 and 517. Cutouts 565 provide a location for the strands of twine to pass across the width of the roll of agricultural plastic, from one spool to another, without the twine wrapping around the spool shafts. Prior to beginning the winding process to form a new roll of agricultural plastic, twine is fed from twine canisters 564 through a cutout 565 in side plate 517 and across the reel and through a cutout 565 in side plate 516. The strands are then tied off. After a roll of agricultural plastic has been wound onto spools 532 and 534, it is ready to be removed from winding device 500. The twine is pulled to the proper length and cut. The two ends of the twine are then tied together to securely bind the roll.

Figure 35:
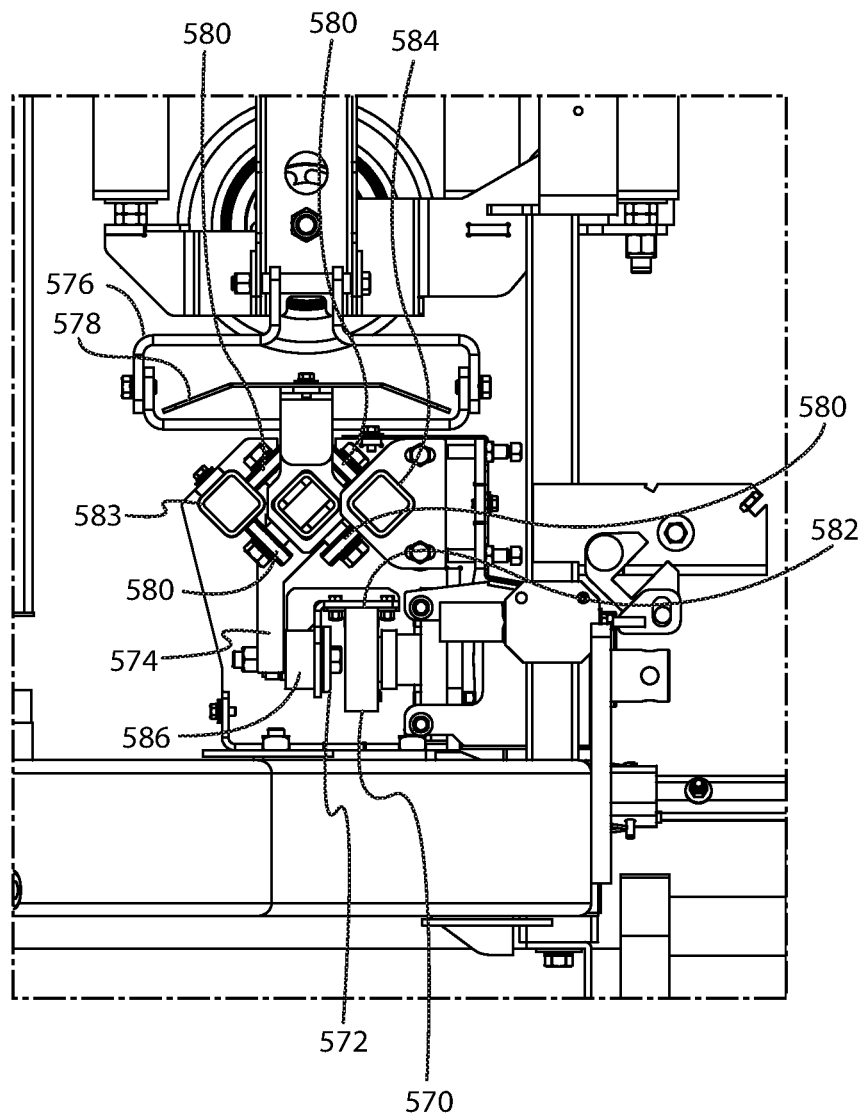
FIG. 35 is a front view of the chain loop assembly of a winding device of FIG. 23.

As best seen in FIG. 35, support structure 576, to which guide assembly 518 is attached, includes a plurality of bearings 580 that ride along one of two support arms 583 or 584, with four of the bearings 580 traveling along support arm 583 and four of bearings 580 traveling along support arm 584. Attachment 582 is an L-shaped bracket with one end thereof attached to chain loop 570 and the other end thereof rotatably attached between washer 572 and a bearing 586. The axes of bearing 586 and washer 572 are parallel to, and in vertical alignment with, the axes of the two sprockets 580. Arm 582 is correspondingly long to attach to bearing 586 and chain loop 570, and is able to smoothly translate along the entirety of the path of chain loop 570. As chain loop 570 is driven along its path by hydraulic motor 568, guide assembly 518 reaches the end of its travel in a given direction. Attachment 582 rotates around the shaft on which it is disposed until it is situated one-hundred eighty degrees opposite the position shown in the figures, and the attachment, and therefore guide assembly 518, begins travel in the opposite direction.

After binding of the agricultural plastics and removal of the bound material from the reels, a user of the present system will be left with a bound roll of agricultural plastic, substantially free of debris and readily transportable for recycling. This provides a significant advantage over dealing with loose plastic material. Further, the present system provides a relatively large, densely-packed end product. In the embodiment of winding device 500 shown in the figures, the two reels have four foot diameters and a combined width of thirty-three inches. This allows for a substantial amount of tightly-packed agricultural plastic to be wound onto a given pair of reels. It is contemplated that the resulting roll of agricultural plastic will have a forty-seven inch diameter and a thirty-three inch height. A forty-foot sea-going shipping container will be able to hold fifty-four rolls of the wound plastic, totaling 45,900 pounds of material due to the dense nature of the end product. Further, these rolls are created without the need for secondary processes such as cleaning or baling. This reduced handling, as well as reduced transportation costs, lead to a salable end product.

Figure 36:
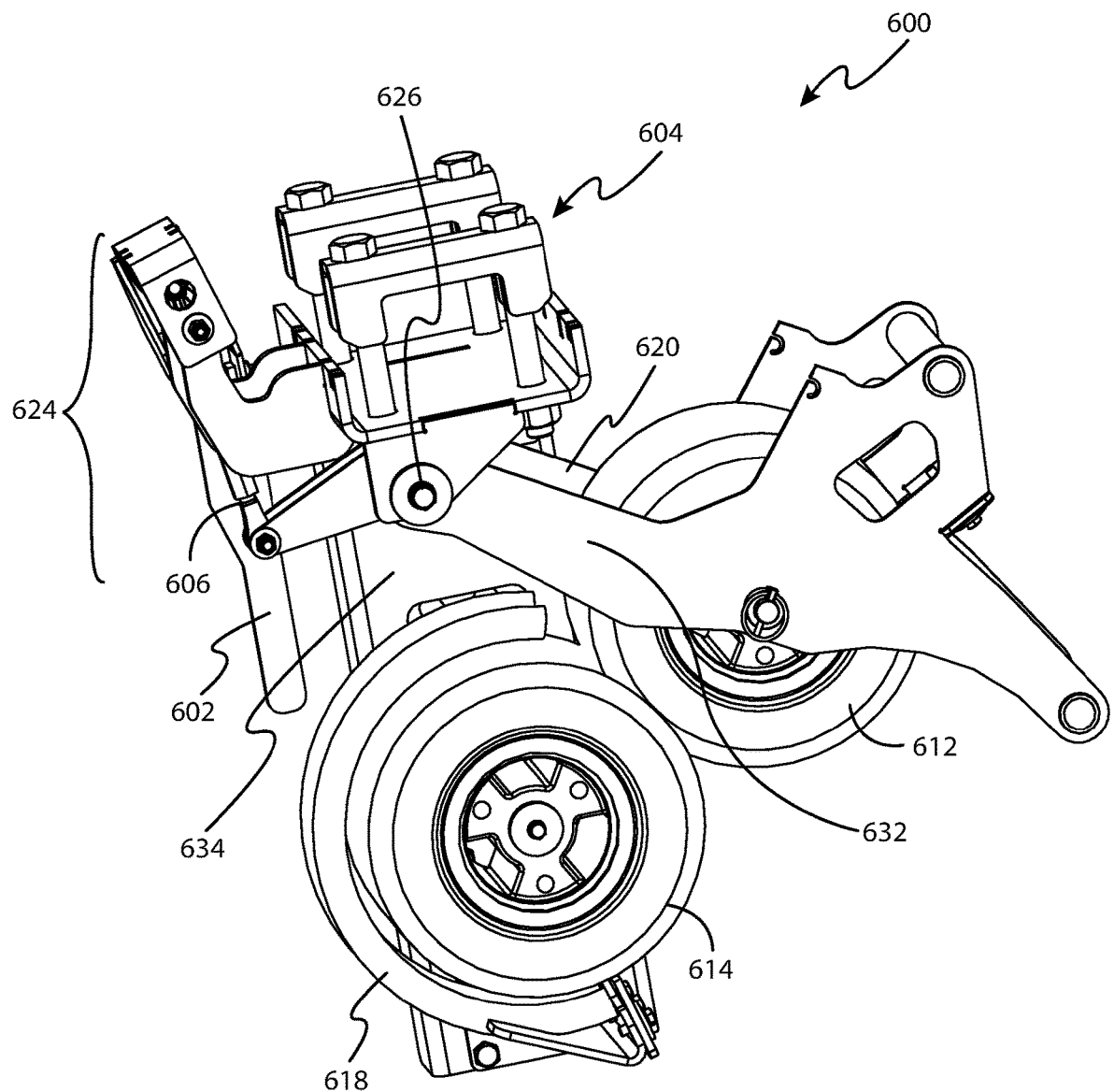
FIG. 36 is a first side perspective view of one alternative embodiment of an extractor head assembly.
Figure 37:
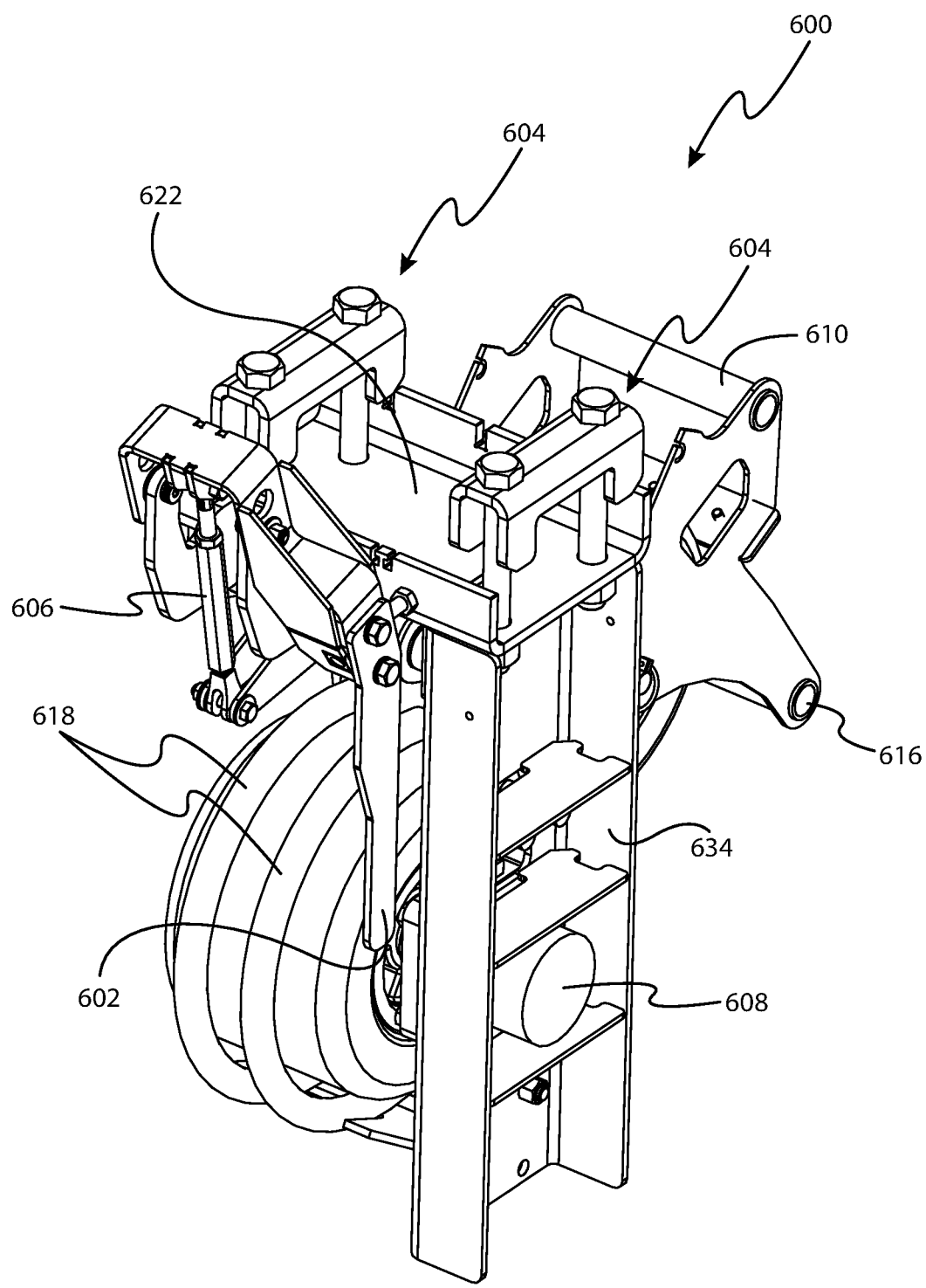
FIG. 37 is a second side perspective view of the extractor head assembly of FIG. 36.
Figure 38:
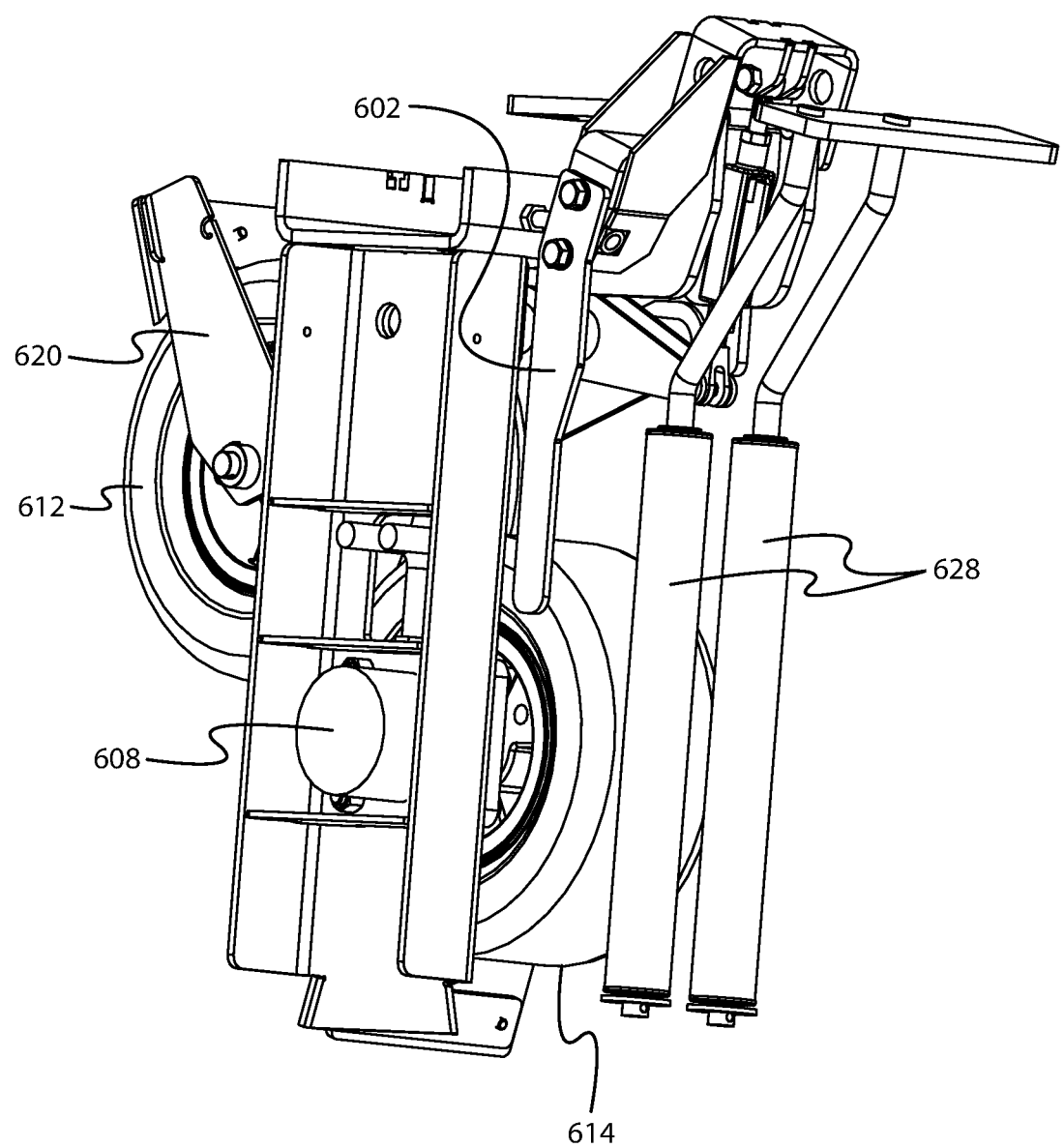
FIG. 38 is a perspective view of an embodiment of an extractor head assembly having a pair of guides to direct agricultural plastics therethrough.

FIG. 36 is a side perspective view of one embodiment of an alternative extractor head assembly 600 constructed in accordance with the principles of the present disclosure. First pinch wheel 612, second pinch wheel 614, and the structure associated therewith differs from that of extractor head assembly 410, discussed above. First pinch wheel 612 rotates on an axle extending between wheel support arms 620 and 632. Second pinch wheel 614 rotates on an axle engaging hydraulic motor 608, which is attached to second pinch wheel support arm 634. Extractor head assembly 600 includes an over-center latch assembly 624 and associated lever 602. Latch assembly 624 allows for manual opening and closing of the gap between first pinch wheel 612 and second pinch wheel 614. Latch assembly 624 includes a link 606 that engages first wheel support arms 620 and 632. Lever 602 allows manipulation of latch assembly 624 by a user of extractor head assembly 600. Attachments 604 are provided at the top of extractor head assembly 600, attached to a support plate 622. Attachments 604 allow the mounting point of a frame to which extractor head assembly 600 is mounted to be above the pinch wheels rather than below them. Although two attachments 604 are shown in the drawings, it is contemplated that a single attachment, or more than two attachments, may be used as necessary or desired. FIG. 37 provides a perspective view of the extractor head assembly 600 from the other side as compared to the view shown in FIG. 36. FIG. 38 provides a perspective view of an embodiment of an extractor head assembly as described above, the extractor head assembly including a pair of guides 628 to guide agricultural plastic to between the first and second pinch wheels. It is contemplated that extractor head assembly 600 may include smaller pinch wheels and an overall more compact structure than extractor head assembly 410, described above.

Figure 39:
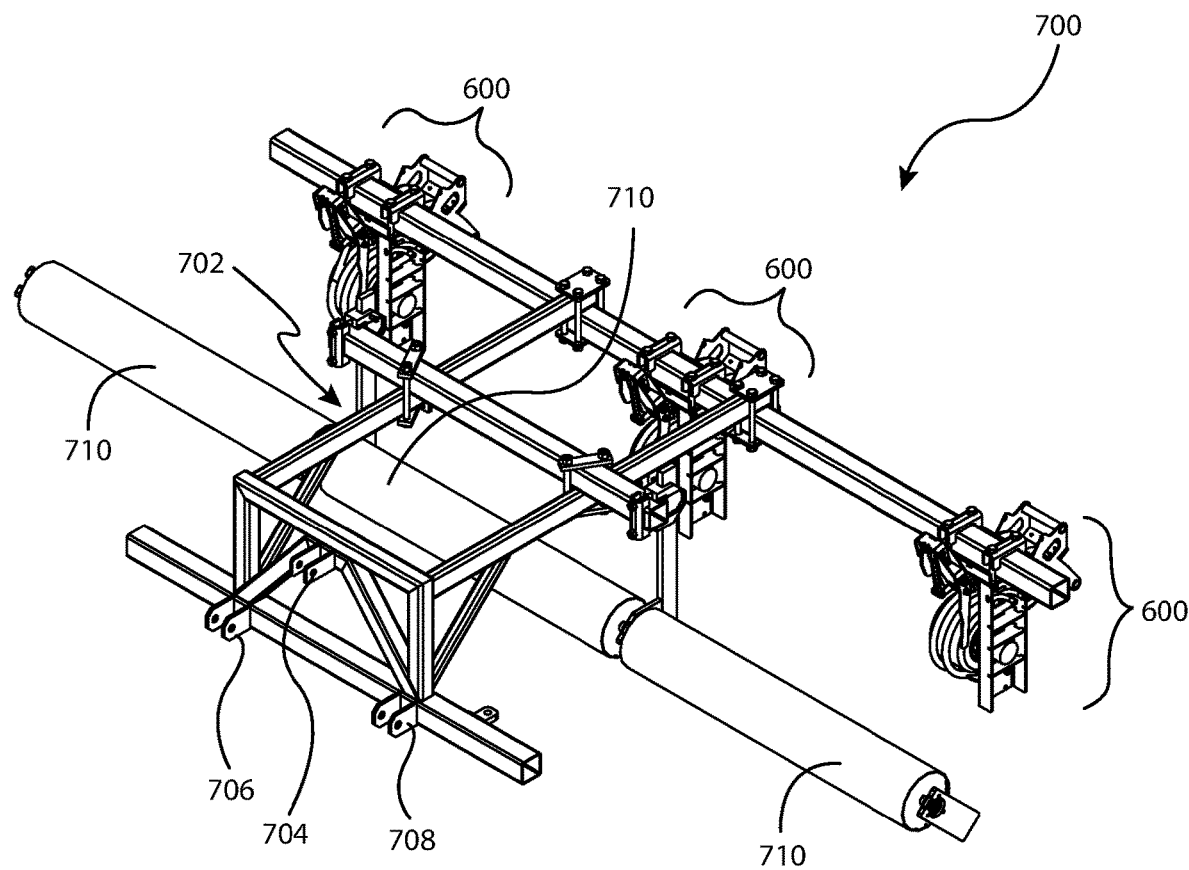
FIG. 39 is a front and side perspective view of a three-row embodiment of an extractor of the present disclosure.

FIG. 39 provides an embodiment of an extractor 700 utilizing three extractor head assemblies 600. Extractor 700 is configured to extract agricultural plastic from three parallel crop beds. Extractor 700 includes a frame 702 on which other components of the device are disposed. Attachments 704, 706, and 708 serve as anchoring points for a three-point hitch for attaching extractor 700 to a tractor or other vehicle. As with extractor system 400, described above, any other suitable structures or methods for attaching extractor 700 to a tractor or other vehicle may be used. Some embodiments of extractor 700 may be self-propelled. Extractor 700 is preferably configured to be powered by a tractor's hydraulic system, though it is contemplated that some embodiments of extractor 700 may be configured to attach to a PTO shaft of a tractor or other vehicle.

Figure 40:
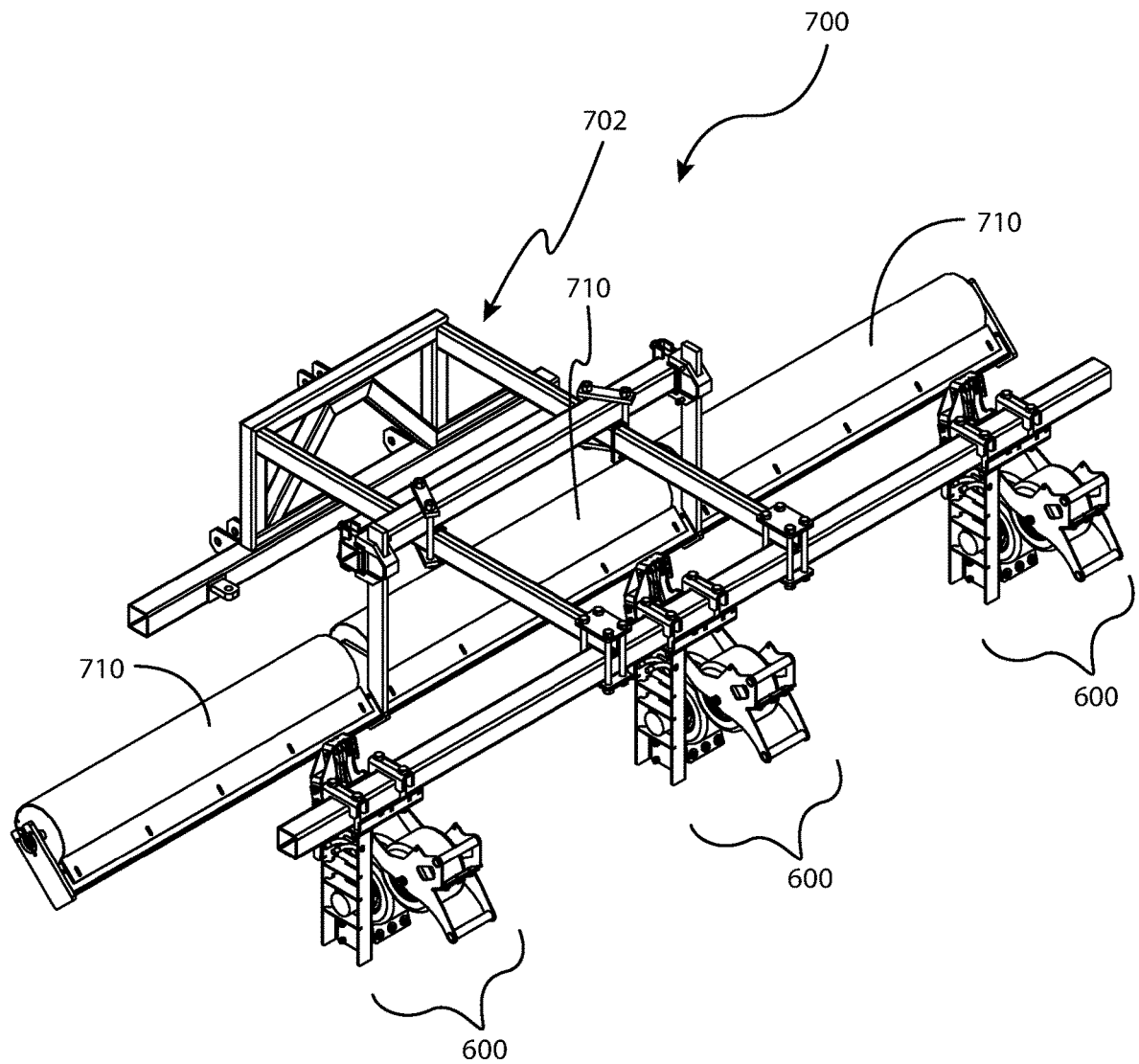
FIG. 40 is a rear and side perspective view of the extractor of FIG. 39.

Extractor 700 is pulled behind a tractor or other vehicle with rollers 710 held above the crop bed, the agricultural plastics to be extracted fed over rollers 710 and into the extractor head assembly 600 that corresponds to a given crop bed. Extractor head assemblies 600 function as described above, and the extraction process performed by extractor 700 is substantially similar to that of extractor system 400. Though a given embodiment of an extractor head assembly is shown associated with extractor 700 in the drawings, it is contemplated that any of the various extractor head assemblies disclosed herein may be used with either of extractor 700 and extractor system 400. FIG. 40 is a rear perspective view of extractor 700.

Various other modifications will be readily apparent to those of skill in the art upon reading this disclosure, and it is contemplated that such modifications remain within the spirit and scope of the present system.

Having thus described the preferred embodiment of the invention, what is claimed as new and desired to be protected by Letters Patent includes the following:

1. A system for extracting and densifying agricultural plastic, the system comprising:

a mower configured to cut plant material on a crop bed, the mower comprising a frame, a blade attached to the frame, and a brush attached to the frame, the brush configured to sweep plant material at an edge of the crop bed into the path of the blade;

an extractor configured to extract agricultural plastic from the crop bed mowed by said mower, the extractor comprising a frame, a roller rotatably attached to the frame, and an extractor head assembly attached to the frame, the extractor head assembly positioned rearward of said roller such that agricultural plastic engaged by said extractor head assembly is pulled over said roller; and a winding device configured to wind the agricultural plastic extracted by said extractor.

2. The system according to claim 1, wherein the frame of the mower comprises a first subframe and a second subframe pivotably attached to the first subframe, and further wherein the blade is a first blade attached to the first subframe and the brush is a first brush attached to the first subframe, the mower further comprising:

a second blade attached to the second subframe;
a second brush attached to the second subframe;
a first subframe roller attached to the first subframe; and
a second subframe roller attached to the second subframe, wherein the first and second subframe rollers engage the surface of the crop bed during operation of said mower, and further wherein the pivotable attachment between the first and second subframes allows each subframe to adjust independently to a portion of the surface profile of the crop bed.

3. The system according to claim 1, wherein the extractor head assembly comprises:
   a first pinch wheel rotatably attached to a first support;
   a second pinch wheel rotatably attached to a second support and pivotably attached to the first support wherein the second support is attached to the frame,
wherein the pivotable attachment of the first support and second support allows the first pinch wheel and second pinch wheel to be engaged or disengaged from one another, and further wherein, when engaged, rotation of said pinch wheels causes extraction of agricultural plastic inserted therebetween.

4. The system according to claim 1, wherein the winding device comprises a reel, the reel comprising:
   a first side plate rotatably attached to a first portion of said frame;
   a first spool extending from said first side plate;
   a second side plate rotatably attached to a second portion of said frame;
   a second spool extending from said second side plate toward said first spool,
wherein the first portion of the frame and the second portion of the frame are pivotably connected so that the second spool is capable of being moved away from the first spool by pivoting the second portion of the frame.

5. The system according to claim 1, wherein the mower is a first mower configured to cut plant material in the crop bed at a first height, the system further comprising a second mower configured to cut plant material remaining in the crop bed after operation of the first mower, the second mower configured to cut plant material at a second height, wherein the second height is lower than the first height.

6. The system according to claim 1, further comprising:
   a drum attached to the frame of said mower; and
   a rotating flange attached to said drum;
wherein said blade is one of a plurality of blades, said plurality of blades disposed along a perimeter of the rotating flange.

7. The system according to claim 3, wherein the extractor is configured such that the speed of rotation of the first and second pinch wheels matches the over the ground speed of the extractor as the extractor travels along a crop bed.

8. The system according to claim 4, wherein said first side plate comprises a first cutout and said second side plate comprises a second cutout, the winding device further comprising:
   a cord dispenser configured to dispense a length of cord through said first and second cutouts prior to winding of said agricultural plastic, such that a densified roll of agricultural plastic prepared by said winding device can be bound using said length of cord.

9. The system according to claim 4, wherein the winding device further comprises:
   a guide assembly attached to said frame and comprising a first pinch wheel rotatably attached to the guide assembly and a second pinch wheel rotatably attached to the guide assembly,
wherein the distance between the first pinch wheel and the second pinch wheel is adjustable, and further wherein the first and second pinch wheels are configured to receive agricultural plastic therebetween.

10. The system according to claim 4, further comprising a guide assembly attached to said frame for guiding said agricultural plastics onto said reel as said reel is rotating, the guide assembly configured to move side to side along the width of said reel such that the agricultural plastics are wound uniformly onto said reel.

11. A method for extracting embedded agricultural plastic from a crop bed, the method comprising the steps of:
   (a) cutting plant material on the crop bed with a mower;
   (b) loosening soil around the embedded agricultural plastic;
   (c) pulling the embedded agricultural plastic free of the crop bed by feeding the agricultural plastic into the extractor head assembly of an extractor;
   (d) depositing the extracted agricultural material onto the surface of the crop bed using the extractor;
   (e) positioning a portion of the agricultural plastic between the first portion of the reel and the second portion of the reel and bringing the first portion of the reel together with the second portion of the reel to secure the agricultural plastic therebetween;
   (f) actuating the reel such that the agricultural plastic is wound therearound;
   (g) retracting a first portion of the reel from a second portion of the reel; and
   (h) allowing the agricultural plastic to fall from said reel.

12. The method according to claim 11, wherein the first portion of the reel is a first spool and the second portion of the reel is a second spool, and further wherein the step of retracting the first portion of the reel from the second portion of the real comprises the step of:
   (a) pivoting the second spool away from the first spool.

* * * * *